(12) United States Patent
Kon

(10) Patent No.: US 7,457,848 B2
(45) Date of Patent: Nov. 25, 2008

(54) OVER-NETWORK RESOURCE DISTRIBUTION SYSTEM AND MUTUAL AUTHENTICATION SYSTEM

(75) Inventor: Masashi Kon, Kanagawa (JP)

(73) Assignee: Sony Corporation, Tokyo (JP)

( * ) Notice: Subject to any disclaimer, the term of this patent is extended or adjusted under 35 U.S.C. 154(b) by 670 days.

(21) Appl. No.: 10/229,484

(22) Filed: Aug. 27, 2002

(65) Prior Publication Data
US 2003/0078894 A1 Apr. 24, 2003

(30) Foreign Application Priority Data
Aug. 27, 2001 (JP) .......................... P2001-256366

(51) Int. Cl.
*G06F 15/16* (2006.01)
(52) U.S. Cl. .................. 709/217; 709/218; 709/219; 709/225; 709/226
(58) Field of Classification Search .................. 709/217, 709/221, 223–224, 226
See application file for complete search history.

(56) References Cited

U.S. PATENT DOCUMENTS

| | | | | |
|---|---|---|---|---|
| 5,903,882 A | * | 5/1999 | Asay et al. | 705/44 |
| 6,005,926 A | * | 12/1999 | Mashinsky | 379/114.02 |
| 6,088,451 A | * | 7/2000 | He et al. | 726/8 |
| 6,463,454 B1 | * | 10/2002 | Lumelsky et al. | 718/105 |
| 6,662,231 B1 | * | 12/2003 | Drosset et al. | 709/229 |
| 6,807,534 B1 | * | 10/2004 | Erickson | 705/51 |
| 6,865,673 B1 | * | 3/2005 | Nessett et al. | 713/155 |
| 6,912,657 B2 | * | 6/2005 | Gehrmann | 713/171 |
| 7,228,291 B2 | * | 6/2007 | Seamons et al. | 705/37 |
| 2002/0083178 A1 | * | 6/2002 | Brothers | 709/226 |
| 2002/0124009 A1 | * | 9/2002 | Hoblit | 707/104.1 |
| 2002/0162020 A1 | * | 10/2002 | Bellaton et al. | 713/201 |

FOREIGN PATENT DOCUMENTS

JP   09265551  A  * 10/1997
JP   2000339270 A * 12/2000

* cited by examiner

*Primary Examiner*—John Follansbee
*Assistant Examiner*—Glenford Madamba
(74) *Attorney, Agent, or Firm*—Bell, Boyd & Lloyd LLP

(57) ABSTRACT

The resources kept by a number of entities are made available mutually by each of the entities. A user using a user terminal requests a resource, to be provided by a resource providing server, to a window server through a communication line. A user information database records information for authenticating the user. A resource provider database records information for verifying a reliability of a resource provider. A resource provider information database records information for verifying the window server. 13 user information database records information of a user authenticated by the window server to allow the access to a resource. A permission data database records information for restricting the access to a resource.

14 Claims, 12 Drawing Sheets

OVER-NETWORK RESOURCE DISTRIBUTION SYSTEM AND MUTUAL AUTHENTICATION SYSTEM

BACKGROUND OF THE INVENTION

The present invention relates to an over-network resource distribution system and mutual authentication system, and more particularly to an over-network resource distribution system having a number of entities, on a network, which respectively possess resources to be utilized by each other, and a mutual authentication system having a number of entities, on a network, that allow for authentication with an arbitrary one of the fellow entities.

In many conventional over-network resource distribution systems, one entity (node on a network as a network constituent element having a function of user authentication, keeping utilizable resources, hereinafter referred to as access restriction) has kept utilizable resources and carried out user-authentication and access-restriction processes (determination processes as to whether to allow the utilization of requested information, including copyright process).

Recently, there has been a proposal of a system allotted with the roles of entities (e.g. users), resource providing servers and window servers. Also, a system is proposed which has a certification authority which specializes in authenticating the mutual authentication between the entities, to issue a public key certification or the like.

However, the conventional over-network resource distribution systems, with fixed entity roles, have not realized a resource distribution form where the resources kept by a number of entities are allowed to be mutually utilized by each of the entities. Therefore, a mutual authentication system has not been realized, which is needed to concretely realize the resource distributing form.

In addition, as is apparent from the above-noted situation, conventional over-network resource distribution systems have not resolved the problem where a number of entity groups are joined to architect a broader network community.

On the other hand, the conventional mutual authentication system set up with a certification authority (mutual authentication system by PKI or the like) involves the problems of absence of a measure to compare the reliability of the certification authority, of increasing number of issuance of public key certifications and certification-based certification, and of non-standardization in the scheme and devising of authentication, public key format and the like.

Meanwhile, the user authentication scheme is different between communities. This is greatly problematic in realizing services and various-leveled communications between the communities.

Thus, special caution is needed in handling the user information (personal information, etc.) collected by the entities. User information is prohibited against effluence and diversion. Thus, there is a background that there is impossibility in concentratedly controlling them in a centralized fashion.

SUMMARY OF THE INVENTION

An object of the present invention is, therefore, to provide an over-network resource distribution system such that the resources kept by a number of entities can be mutually utilized by each of the entities.

Another object of the present invention is, therefore, to provide a mutual authentication system effectively realizing the mutual authentication needed in mutually utilizing the services (providing a resource or the like) to be provided by a number of entities by each of the entities.

In an embodiment, the present invention provides an over-network resource distribution system for allowing one or more users to request resources to be provided by one or more resource providing servers through user terminals connected by communication lines to the resource providing servers, the resource requested being downloaded for utilization through the communication line onto the user terminal. The over-network resource distribution system includes one or more window servers having a first user information database recording information required in authenticating the user and a first resource provider information database recording information required in verifying a reliability of a resource provider, to serve as a window of a resource request to be sent from an arbitrary one of the user terminals of the users to the resource providing server thereby sending a resource request command corresponding to the resource request to the resource providing server designated in the resource request; and the resource providing server having a second resource provider information database recording information required in authenticating the window server, a second user information database extractably recording information about the user authenticated by the window server, and a permission data database recording restriction of accessing a resource to be provided to the user, to send the resource in response to a resource request of from arbitrary one of the window servers.

The present invention also provides a mutual authentication system in a network community including a first community having one or more service servers, one or more users who use services provided by the service servers and one or more window servers mediating between the service serves and the user terminals of the users, and a second community having similar constituent elements as the first community. The mutual authentication system includes a first certification authority for issuing a public key certification prepared by an arbitrary one of a number of window servers belonging to a first community; a second certification authority for issuing a public key certification prepared by an arbitrary one of a number of window servers belonging to a second community; and a rating server haring a reliability database for recording evaluation information such that public key certifications issued by the first and second certification authorities are evaluated on the basis of predetermined evaluation items.

In the one embodiment of the present invention, an over-network resource distribution system is provided with a window server for performing a window operation duty for a resource providing server, wherein the window server has a first user information database recording the user Information required for authenticating a user and a first resource provider information database recording credit information for a resource provider (entity) within a network community. The resource providing server further includes a second resource provider information database recording information required for authenticating the window server and a second user information database recording the user information including the information concerning the user authenticated by the window server. Thus, the resources kept by a number of entities can be mutually utilized by each of the entities.

Also, the network community having a number of communities is set up with a rating server having a function to evaluate the public key certifications respectively issued by a number of certification authorities belonging to any of the number of communities, to enable checking for mutual credits, credits of the public key certifications used and security sum between a number of window servers belonging to any of the number of communities. Due to this, the mutual authentication, as needed, in mutually utilizing the services provided by the number of entities is effectively realized by each of the entities.

Additional features and advantages of the present invention are described in, and will be apparent from, the following Detailed Description of the Invention and the Figures.

DETAILED DESCRIPTION OF THE INVENTION

First Embodiment

Figure 1:
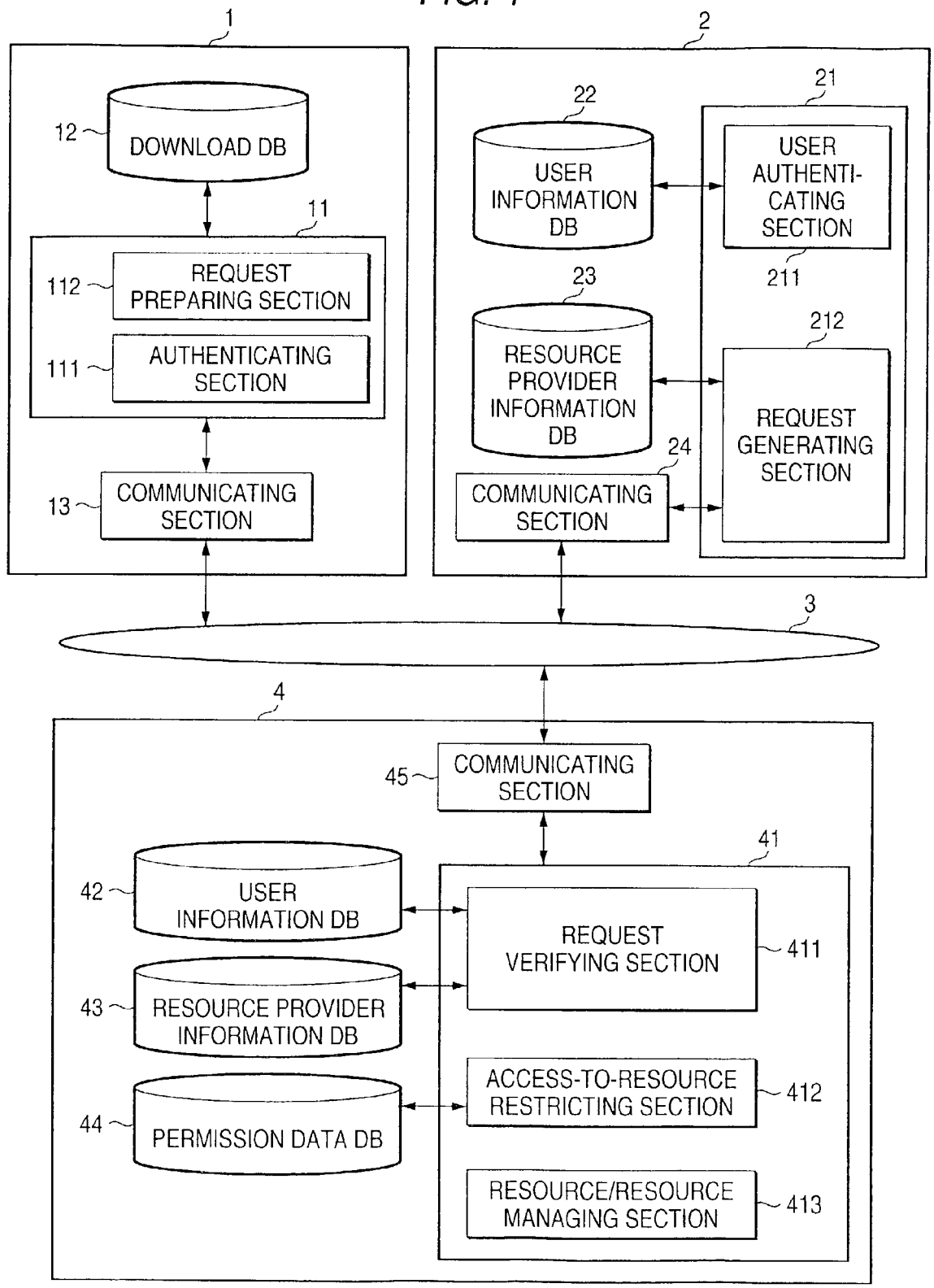
FIG. 1 is a block diagram showing an overall configuration of an over-network resource distribution system according to a first embodiment of the present invention.

This embodiment is concerned with an over-network resource distribution system that allows a number of entities to mutually make use of the resources being kept by the entities. FIG. 1 is a block diagram showing an overall configuration of an over-network resource distribution system according to a first embodiment of the present invention.

The over-network resource distribution system of this embodiment includes a user terminal 1 to be used by a resource user, a window server 2 serving as a window of a request from the user terminal 1, a communication line 3 for communication between the user terminal 1, the window server 2 and a resource providing server 4, and the resource providing server 4 which stores and keeps resources to be provided to the user. It should be appreciated that the user terminal 1, the window server 2 and the resource providing server 4, can be provided in any suitable number. It should also be appreciated that, the communication line 3 can include the Internet on its route or can be entirely configured by the Internet.

It should be appreciated that the resources being provided herein can include various pieces of information (contents) in the form of, for example, still images, moving images, text, sound, service information and the like.

The user terminal 1 includes a control section 11 for carrying out and controlling the process required for a resource request, a download database 12 for storing a downloaded resource and a communicating section 13 for connecting to the communication line 3.

The control section 11 includes an authenticating section 111 to manage the authenticating information required in undergoing an authentication by the window server 2, and a request preparing section 112 to prepare a command for requesting a resource (resource request command).

The window server 2 includes a control section 21 for carrying out and controlling the process required for the operation at the window of a requested resource, a user information database 22 recording personal information about the users, a resource provider information database 23 recording the reliability information about the resource providers (original resource server, resource providing server (referred to herein as resource providing server 4), window server (referred to herein as window server 2) and a communicating section 24 for connecting to the communication line 3.

The control section 21 includes a user authenticating section 211 four authenticating a user and converting a utilizable resource sent from the resource providing server 4 into a form providable to the user, and a request generating section 212 for generating a command for requesting a resource to the resource providing server (referred to herein as resource providing server 4) keeping the requested resource, that is, a resource request command.

The resource providing server 4 includes a control section 41 for carrying out and controlling the process required to deliver a requested resource, a user information database 42 recording the personal information about the users, a resource provider information database 43 recording the reliability information about the resource provider, and a permission data database 44 recording the information about whether to allow the use of a resource or not. It should be noted that a database for storing and keeping the resources to be provided to the user has been omitted.

The control section 41 includes an authenticating section (not shown) for authentication at the window server 2, a request verifying section 411 for verifying a resource request command from the window server 2 and for converting a utilizable resource into a sendable form, an access-to-resource restricting section 412 for determining whether to allow the utilization of requested information and for extracting a utilizable resource to be provided to the user while processing a copyright or the like, and a resource/resource managing section 413 for managing the resource to be provided to the user and the status of the resources.

In this embodiment, the request verifying section 411 and the access-to-resource restricting section 412 are both modules within the resource providing server 4. However, in alternate embodiments, the request verifying section 411 (i.e., the module for verifying a resource request command) and the access-to-resource restricting section 412 (i.e., the module for verifying a restriction of access to a resource) do not necessarily exist in the same entity.

The control section 11 of the user terminal 1 starts up the request preparing section 112 to prepare a resource request command, arid further starts up the communicating section 13 to send the resource request command to the window server 2 through the communication line 3. The resource request command includes the information designating a resource provider. It should be appreciated that the resource request command can be encrypted if necessary. In the encryption, a protocol for cipher communication, such as SSL (Secure Sockets Layer), can be used for an ID & password. Incidentally, in sending the resource request command, the request preparing section 112 is authenticated by the window server 2 using the authentication information managed by the authenticating section 111, to obtain a secure path. The secure path can be obtained as a result of mutual authentication, such as of PKI (Public Key Infrastructure). Thereafter, with this command the control section 11 records the resource sent from the window server 2 to the download database 12.

The control section 21 of the window server 2 starts up the user authenticating section 211 and the request generating section 212. The user authenticating section 211 authenticates the user by making reference to the user information database 22. When authentication is made, the control section 21 delivers the resource request command sent from the user terminal 1 to the request generating section 212.

The request generating section 212 makes reference to the resource provider information n5 23 to verify a reliability of a resource provider designated by the received resource request command. When the reliability of the resource provider is not assured according to a verification result, the user terminal 1 is notified of this fact through the communicating section 24 and communication line 3.

When the reliability of the service provider is assured, the request generating section 212 prepares a resource request command for the resource providing server keeping a utilizable resource (referred to herein as resource providing server 4) and sends the resource request command to the resource providing server 4 through the communicating section 24 and communication line 3. Upon sending the resource request command, the request generating section 212 obtains a secure path through a mutual authentication with the resource providing server 4. It should be appreciated that the resource request command includes the user information to specify a user who has requested the resource. Furthermore, the request generating section 212 converts the utilizable resource sent from the resource providing server (referred to herein as resource providing server 4) into a form deliverable to the user.

The control section 41 of the resource providing server 4 authenticates the window server 2 and starts up the request 13 verifying section 411, the access-to-resource restriction section 412, and the resource/resource managing section 413. The request verifying section 411 verifies the resource request command from the window server 2. The access to-resource restricting section 412 determines whether to allow the utilization of requested information or not, and extracts a utilizable resource to be provided to the user while processing a copyright or the like. The resource/resource managing section 413 updates the record of a kept resource state.

The request verifying section 411, after a utilizable resource to be provided to the user has been extracted from the resource/resource managing section 413, converts the resource into a sendable form to the window server 2 and sends it to the window server 2 through the communicating section 45 and communication line 3.

The request verifying section 411 verifies the resource request command from the window server 2, thereby determining a response to the resource request command. The resource request command is verified by any one of the methods of verifying a reliability of the window server 2 having authenticated the user or of verifying a reliability of the user. The algorithm for selecting any of the methods is previously determined for the request verifying section 411. When verifying a reliability of the window server 2, reliability information about the window server 2 is extracted from the resource provider information database 43 to determine, according to the content thereof, whether to allow the access to the resource. When verifying a reliability of the user, reference is made to the user information contained in the resource request command from the window server 2 to specify a user. The personal information concerning the same user is retrieved through and extracted from the user information database 42 to determine, according to the content thereof, whether to allow the access to the resource or not.

Figure 2:
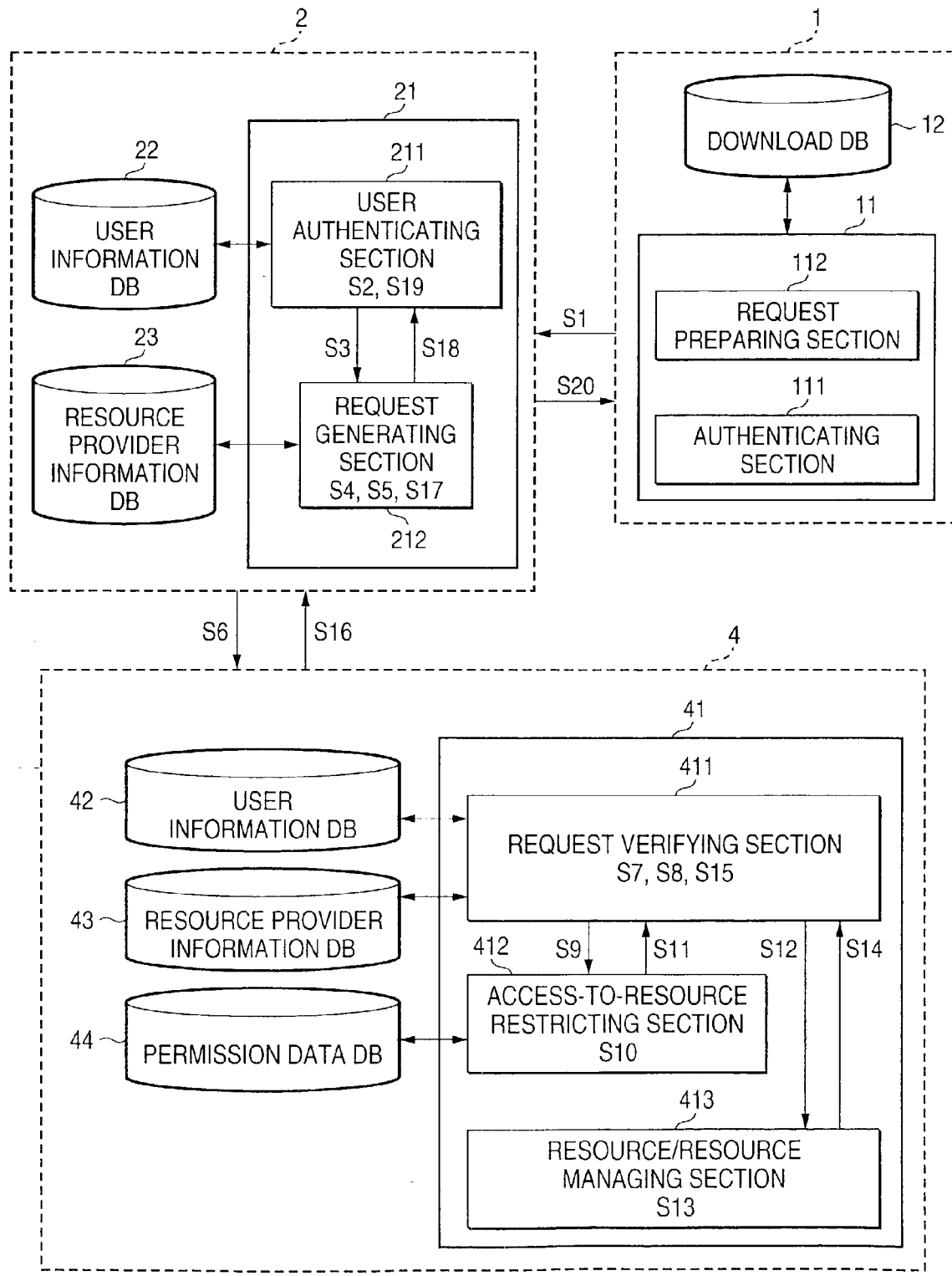
FIG. 2 is an explanatory diagram showing an operation of the over-network resource distribution system according to the first embodiment of the present invention.

FIG. 2 is an explanatory diagram showing an operation of the over-network resource distribution system according to the first embodiment of the invention. In FIG. 2, there is shown an operation of the over-network resource distribution system such that the user, using the user terminal 1, requests a resource kept by the resource providing server 4 through the window server 2. The references S1-S20 shown in FIG. 2 denote operation steps. Each describing position of the references S1-S20 assumably represents an on-system position where the relevant operation step is to be executed. With reference to FIG. 2, explanation will now be made on the operation of the over-network resource distribution system according to the present embodiment.

First, in step S1, the user uses the user terminal 1 to prepare a resource request command requesting a resource kept by the resource providing server 4. By an authentication in the user authenticating section 211 of the window server 2, a secure path is established with the window server 2. Thereafter, a prepared resource request command is sent to the window server 2.

It should be appreciated that the resource request command is encrypted as necessary. In the encryption, a cipher-communication protocol, such as SSL, can be used for an ID & password.

The secure path, to be established in sending the resource request command, is obtained by an authentication of the request preparing section 112 by the window server 2 according to the authenticating information, managed by the authenticating section 111 or a mutual authentication due to PKI or the like. In an authentication based on PKI, where the user possesses a pair of his or her own signature-secret and public keys, a secure path is realized by a consent on a session key through a certification-based mutual authentication.

In step S2, the user authenticating section 211 of the window server 2 authenticates the user to establish a secure path with the user terminal 1., and thereafter accepts a resource request command from the user terminal 1. When forming a PKI-based secure path, reference is made to the user information database 22 to check for a contradiction against a resource request command content. The ID & password is checked for a contradiction between the information provided by the user and the resource request command content.

In step S3, in case the user authenticating section 211 has authenticated the user, a request for providing the resource based on the resource request command is forwarded to the request generating section 212.

In step S4, the request generating section 212 verifies whether the resource provider included in the resource request command is reliable or not, by making reference to the resource provider information database 23. When the resource provider is not reliable or is less reliable, a notification to this effect is sent back to the user terminal 1.

In step S5, the request generating section 212 prepares a resource request command for the resource providing server 4. Also, a secure path is generated that is to be established with the resource providing server 4. At this time, when the service path is based on PKI, certification-based mutual authentication and session-key consent are performed. With only server authentication based on server-certification authentication, a secure path is architected by SSL or the like. It is possible to record an authentication form and information required for authentication to the resource provider information database 23.

In step S6, after the authentication has been performed, the request generating section 212 sends to the resource providing server 4 the resource request command for the resource providing server 4 prepared in the step S5. In step S7, the request authenticating section 411 of the resource providing server 4, after being authenticated with the window server 2 in step S6, verifies the resource request command sent from the window server 2.

In step S8, the request verifying section 411 determines a response to the resource request command, according to a verification result in the step S8. The resource request command is verified by any one of the methods of verifying a reliability of the window server 2 having authenticated the user or of verifying a reliability of the user. The algorithm for selecting any of the methods is previously determined for the request verifying section 411. When verifying a reliability of the window server 2, reliability information about the window server 2 is extracted from the resource provider information database 43 to determine, according a content thereof, whether to allow the access to the resource. If the reliability of the user is verified, reference is made to the user information included in the resource request command from the window server 2 to specify a user. The personal information of the user is retrieved through and extracted from the user information database 42 to determine, according to a content thereof, whether to allow access to the resource or not. When the determination is to allow access to the resource, a check request is prepared to verify a restriction from accessing the resource.

In step S9, the check request prepared in the step S8 is forwarded from the request verifying section 411 to the access-to-resource restricting section 412. The module for verifying a restriction from accessing the resource (i.e., access-to-resource restricting section 412) does not necessarily exist in the same entity (i.e., resource providing server 4) as the module for verifying a resource request command (i.e., request verifying section 411). Where they both exist in different entities, inquiry for mutual authentication or secure-pass establishment is performed, prior to forwarding the check request, between the request verifying section 411 and the access-to-resource restricting section 412.

In step S10, the access-to-resource restricting section 412 verifies a received check request to determine whether to allow access to the resource. In this determination, reference is made to the permission data database 44. The permission data database 44 records a resource state (including right status of copyright or the like) and permission information about operation. Where permission information differs depending upon the entity (resource provider), an entity kind is included in the check request prepared by the request verifying section 411.

In step S11, a response to the check request is sent back from the access-to-resource restricting section 412 to the request verifying section 411.

In step S12, the request verifying section 411, if the response to the check request received from the access-to-resource restriction section 412 is to allow access for resource utilization, instructs a process required by the resource request command (extracting a resource, or the like) to the resource/resource managing section 413. When the response to the check request is not to allow access for resource utilization, the process proceeds to step S15.

In step S13, the resource/resource managing section 413 extracts requested resource information and delivers it to the request verifying section 411, updating the record of resource status. It should be appreciated that it is possible for the resource/resource managing section 413 to deliver to the request verifying section 411 only the information required in accessing the requested resource information without delivering the request resource information itself. In step S14, the request verifying section 411 receives from the resource/resource managing section 413 the resource information requested in the resource request command.

In step S15, where the response to check request received from the access-to-resource restricting section 412 is to allow access for resource utilization, the request verifying section 411 converts the resource information received in the step S14 into a form to be sent to the window server 2. When the response to check request received from the access-to-resource restricting section 412 is not to allow access for resource utilization, the request verifying section 411 converts the information for notification of non-permission, and attendant information if present, into a form to be sent to the window server 2.

In step S16, the request verifying section 411 sends the resource information in the sendable form converted in the step S15 to the window server 2. In step S17, the request generating section 212 of the window server 2 verifies the resource information sent from the request verifying section 411 of the resource providing server 4. Also, on the basis of this information, the record in the user information database 22 and resource provider information, database 23 is updated if necessary. Furthermore, this information is converted into a form to be sent to the user terminal 1.

In step S18, the request generating section 212 forwards the resource information in the sendable form to the user authenticating section 211. In step S19, the user authenticating section 211 carries out a process required for sending the resource information in the sendable form to the user terminal 1 (e.g., providing a signature). In step S20, the resource information processed in the sendable form is sent front the window server 2 to the user terminal 1.

Figure 3:
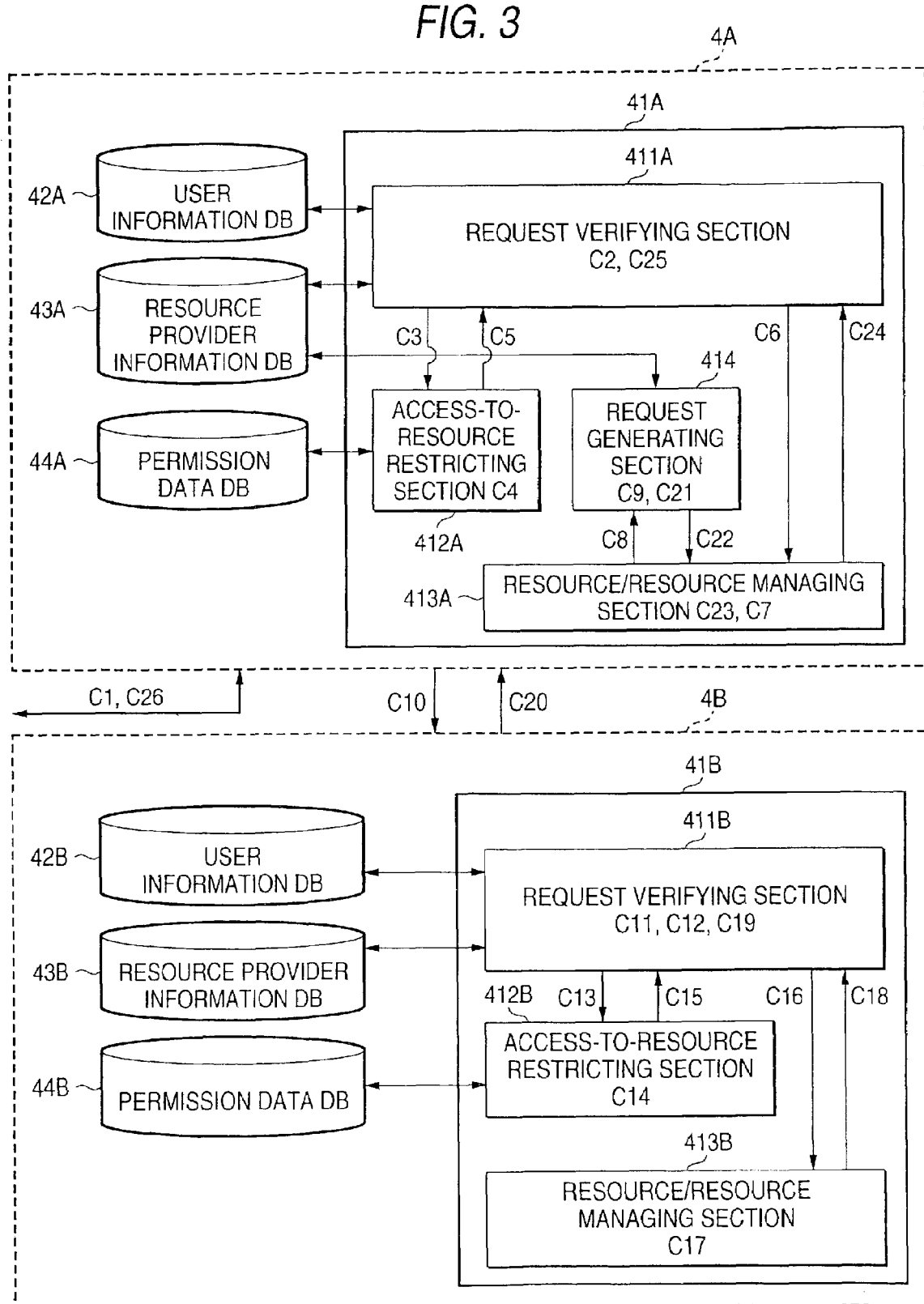
FIG. 3 is an explanatory diagram showing an operation of the over-network resource distribution system according to the first embodiment of the present invention.

FIG. 3 is an explanatory diagram showing one operation of the over-network resource distribution system according to the first embodiment of the invention. FIG. 3 shows an operation where a first entity supplies a utilizable resource to a second entity. The references C1-C25 shown in FIG. 3 denote operation steps. Each describing position of the references C1-C25 assumably represents an on-system position where the relevant operation step is to be executed. With reference to FIG. 3, explanation will now be made on the operation of the over-network resource distribution system according to the present embodiment.

First, in step C1, a resource request command for the resource providing server 4A is sent from an entity at anywhere (i.e., a composite of a certain user and a user terminal thereof, hereinafter referred to as "entity X") to the resource providing server 4A in this transmission, a secure path is established by mutual authentication similar to the explanation for steps S5 and S6 in FIG. 2.

In step C2, the request verifying section 411A of the resource providing server 4A verifies the resource request command for the resource providing server 4A. Also, with a verification result, a determination is made on a response to the resource request command. The resource request command is verified by any one of the methods of verifying a reliability of the entity X having authenticated the user or of verifying a reliability of the user. The algorithm for selecting any of them is previously determined for the request verifying section 411A. When verifying a reliability of the entity X, reliability information about the entity X is extracted from the resource provider information database 43A to determine, according to the content thereof, whether to allow access to the resource. Meanwhile, when verifying a reliability of the user, reference is made to the user information contained in the resource request command from the entity X to specify a user. The personal information concerning the same user is retrieved through and extracted from the user information database 42A to determine, according to the content thereof, whether to allow access to the resource or not. When the determination is to allow access to the resource, a check request is prepared for verifying a restriction from accessing the resource.

In step C3, the check request prepared in the step C2 is forwarded from the request verifying section 411A to the access-to-resource restricting section 412A. The module for verifying a restriction from accessing the resource (i.e., access-to-resource restricting section 412A) does not necessarily exist in the same entity (i.e., resource providing server 4A) as the module for verifying a resource request command (i.e., request verifying section 411A). Where they both exist in different entities, inquiry for mutual authentication or secure-pass establishment is performed, prior to forwarding the check request, between the request verifying section 411A and the access-to-resource restricting section 412A.

In step C4, the access-to-resource restricting section 412A verifies a received check request to determine whether to allow the access to the resource. In this determination, reference is made to the permission data database 44A. The permission data database 44A records resource state (including right status of copyright or the like) and permission information about operation. Where permission information differs depending upon the entity (resource provider), an entity kind is included in the check request prepared by the request verifying section 411A.

In step C5, a response to the check request is sent back from the access-to-resource restricting section 412A to the request verifying section 411A. In step C6, the request verifying section 411A, if the response to the check request received from the access to restriction section 412A is to allow access for resource utilization, instructs a process required by the resource request command (extracting a resource, etc.) to the resource/resource managing section 413A. Where the response to the check request is not to allow access for resource utilization, the process proceeds to step C23.

In step C7, the resource/resource managing section 413A extracts requested resource information. However, because the requested resource is kept in the resource providing server 4B, the resource/resource managing section 413A prepares a resource request command preparing request for the request generating section 414 to prepare a resource request command for the resource providing server 4B. The resource request command preparing request includes information representative of a resource required and the information designating a resource provider. In step C8, the resource request command preparing request prepared in step C7 is forwarded to the request generating section 414.

In step C9, the request generating section 414 prepares a resource request command to be sent to the resource providing server 4B. At this time, whether the requester to be included in this resource request command is the entity X or the resource providing server 4A is determined by a previously given algorithm. This algorithm can be provided to determine according, for example, to a shouldering of occurring expenses, the condition the resource providing server 4B needs a resource to be kept, or the like. Meanwhile, where a resource provider is designated in the resource request command preparing request, reference is made to the resource provider information database 43A to verify a reliability of the resource provider. Furthermore, where a resource only is designated in the resource request command preparing request without designation of a resource provider, reference is also made to the resource provider information database 43A to retrieve an optimal resource provider. Hereinafter, the resource provider referenced herein is the resource providing server 4B.

In step C10, the request generating section 414 sends to the resource providing server 4B the resource request command for the resource providing server 4B prepared in the step C9. In the transmission, mutual authentication required is performed to establish a secure path. The authentication method and the secure-pass preparing method are provided from the information concerning the resource providing server 4B recorded in the resource provider information database 43A. In step C11, the request verifying section 411B of the resource providing server 4B, after authentication is performed with the resource providing server 4A, in the step C10, verifies the resource request command sent from the resource providing server 4A.

In step C12, the request verifying section 411B determines a response to the resource request command, according to a verification result of in the step C10. The resource request command is verified by any one of the methods of verifying a reliability of the resource providing server 4A having authenticated the entity X (user) or of verifying a reliability of the entity X. The algorithm for determining whether to select any of the methods is previously determined for the request verifying section 411B. Where verifying a reliability of the resource providing server 4A, reliability information about the resource providing server 4A is extracted from the resource provider information database 43B to determine, according to a content thereof, whether to allow access to the resource or not. Meanwhile, where verifying a reliability of the entity X, reference is made to the user information included in the resource request command from the resource providing server 4A to specify a entity X. The personal information concerning the entity X is retrieved through and extracted from the user information database 42B to determine, according to a content thereof, whether to allow access to the resource or not. When the determination is to allow access to the resource, a check request is prepared for verifying a restriction from accessing the resource.

In step C13, the check request prepared in C12 is forwarded from the request verifying section 411B to the access-to-resource restricting section 412B. The module for verifying a restriction from accessing the resource (i.e., access-to-resource restricting section 412B) does not necessarily exist in the same entity (i.e., resource providing server 4B) as the module for verifying a resource request command (i.e., request verifying section 411B). Where they both exist in the different entities, inquiry for mutual authentication or secure-pass establishment is performed, prior to forwarding the check request, between the request verifying section 411B and the access-to-resource restricting section 412B.

In step C14, the access-to-resource restricting section 412B verifies a received check request to determine whether to allow or not allow access to the resource. In this determination, reference is made to the permission data database 44B. The permission data database 44B records resource state (including right status of copyright or the like) and permission information about the operation. Where permission information differs depending upon the entity (resource provider), an entity kind is included in the check request prepared by the request verifying section 411B.

In step C15, a response to the check request is sent back from the access-to-resource restricting section 412B to the request verifying section 411B. In step C16, the request verifying section 411B, if the response to the check request received from the access-to-restriction section 412B is to allow access for resource utilization, instructs a process required by the resource request command (extracting a resource, etc.) to the resource/resource managing section 413B. Where the response to the check request is not to allow access for resource utilization, the process proceeds to step C19.

In step C17, the resource/resource managing section 413B extracts requested resource information and delivers it to the request verifying section 411B, updating the record of resource status. It should be appreciated that it is possible for the resource/resource managing section 413B to deliver to the request verifying section 411B only the information required in accessing the requested resource information without delivering the requested resource information itself. In step C18, the request verifying section 411B receives from the resource/resource managing section 413B the resource information requested in the resource request command.

In step C19, where the response to check request received from the access-to-resource restricting section 412B is to allow access for resource utilization, the request verifying section 411B converts the resource information received in the step C18 into a form sendable to the resource providing server 4A. When the response to check request received from the access-to-resource restricting section 412B is not to permit resource utilization, the request verifying section 411B converts the information for notification of non-permission, and attendant information, if present, into a form sendable to the resource providing server 4A.

In step C20, the request verifying section 411B sends the resource information in the sendable form converted in the step C19 to the resource providing server 4A.

In step C21, the request generating section 414 of the resource providing server 4A verifies the resource information sent from the request verifying section 411B of the resource providing server 4B. Also, on the basis of this information, updated is the record in the user information database 42A and resource provider information database 43A is updated if necessary. Furthermore, this information is converted into a form to be forwarded to the resource/resource managing section 413A.

In step C22, the request generating section 414 forwards the resource information in the sendable form to the resource/resource managing section 413A. In step C23, the resource/resource managing section 413A converts the resource information in the sendable form into a form for transmission to the entity X. Also, it is possible herein to add the resource information in the sendable form to the resource being managed by the resource/resource managing section 413A.

In step C24, the resource information in the form for transmission to the entity X is forwarded from the resource/resource managing section 413A to the request verifying section 411A. In step C25, the resource information in the form for sending to the entity X is processed as required four sending to the entity X (providing a signature, etc.). In step C26, the processed resource information in the sendable form is sent from the resource providing server 4A to the entity X.

Second Embodiment

The present embodiment is concerned with a mutual authentication system due to a credit-rating type model.

This embodiment is characterized by rating the public key certifications issued by a number of certification authorities, preparing a credit correspondence table (including two kinds, a correspondence table relating to credit and a correspondence table relating to security sum) on the basis of credit-rating information prepared, sending back a credit response, a security sum response or a credit and security-sum response to an inquiry on a certification, and determining whether to make a mutual authentication according to a content of response and a credit of a rating organization.

Figure 4:
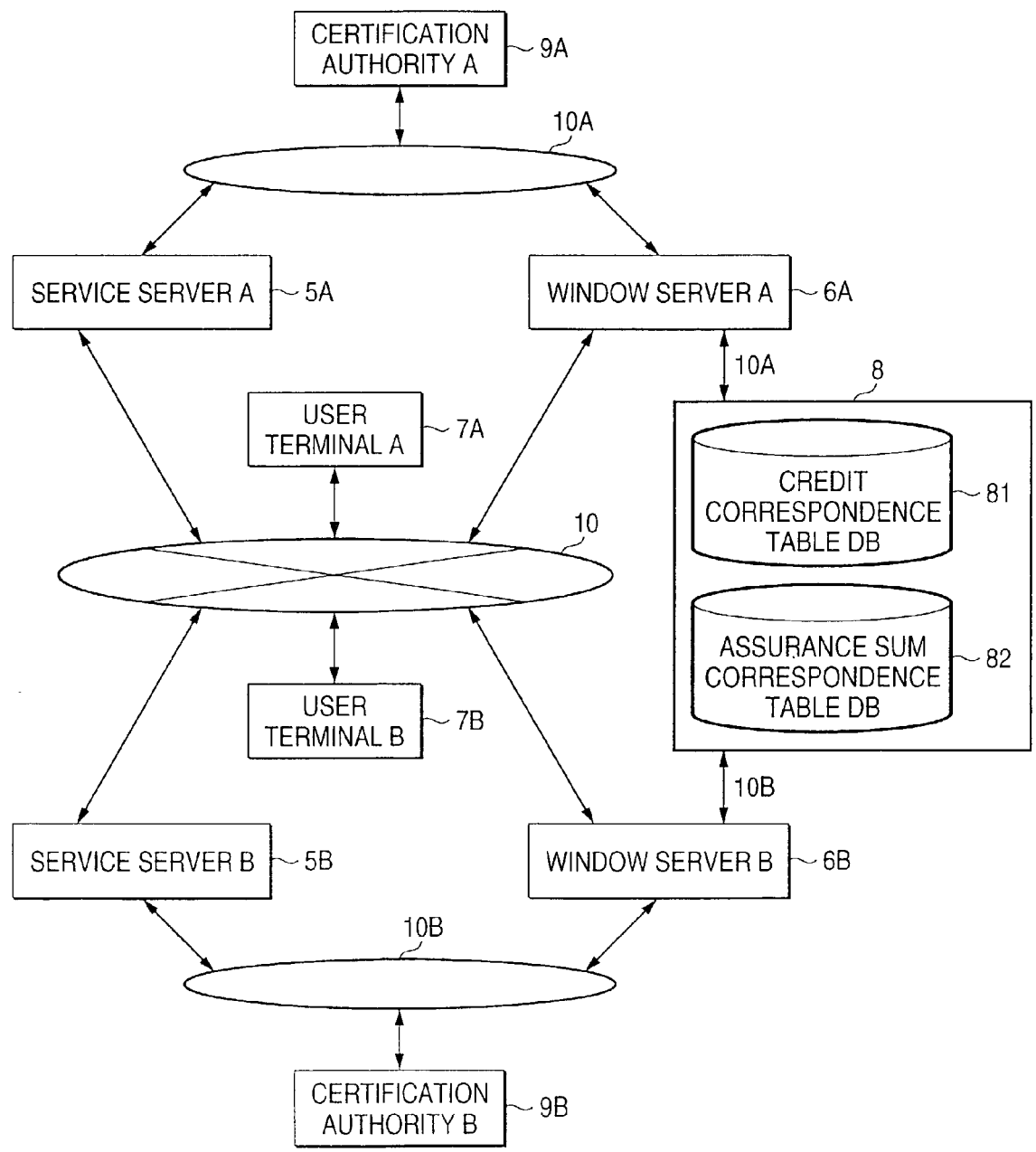
FIG. 4 is a block diagram showing an overall configuration of a mutual authentication system according to a second embodiment of the present invention.

FIG. 4 is a block diagram showing an overall configuration of a mutual. authentication system according to a second embodiment of the invention.

The mutual authentication system of this embodiment includes service servers A (5A) and B (5B) for services such as providing resources; window servers A (6A) and B (6B) respectively on duty of operation at the window of service servers A (5A) and B (5B); a rating server 8 for rating the pubic key certifications issued by a number of certification authorities; certification authorities A (9A) and B (9B) for issuing various certifications including public key certifications; a private communication line A (10A) connecting the service server A (5A), the window server A (6A), the rating server 8 and the certification authority A (9A); a private communication line B (10B) communicably connecting between the service server B (5B), the window server B (6B), the rating server 8 and the certification authority B (9A); user terminals A (7A) and B (7B) to be used by users A and B (not shown); and an Internet 10 connecting the service servers A (5A), B (5B), window servers A (6A), B (6B) and user terminals A (7A), B (7B). The private communication lines 10A, 10B can each include the Internet 10 on its route. Otherwise, the entire path can be formed by the Internet 10. In addition, the Internet 10 can be substituted with another private communication line.

The above-referenced elements have functions, except the rating server 8, similar to those of the corresponding constituent elements of the over-network resource distribution system of the first embodiment of FIG. 1. Specifically, the service server A (5A), B (5B) of FIG. 4 corresponds to the resource providing server 4 of FIG. 1, the window server A (6A), B (6B) of FIG. 4 to the window server 2 of FIG. 1, and the user terminal A (7A), B (7B) of FIG. 4 to the user terminal 1 of FIG. 1.

The rating server 8 sends back a response in combination of a credit-related correspondence table and a security sum-related correspondence table, for an inquiry from the window server B (6B). The content of the inquiry from the window server B (6B) includes the information of a reliability of the certification authority A (9A), a content of the assurance by the certification authority A (9A), how to shoulder an occurring expense, and so forth.

Figure 5:
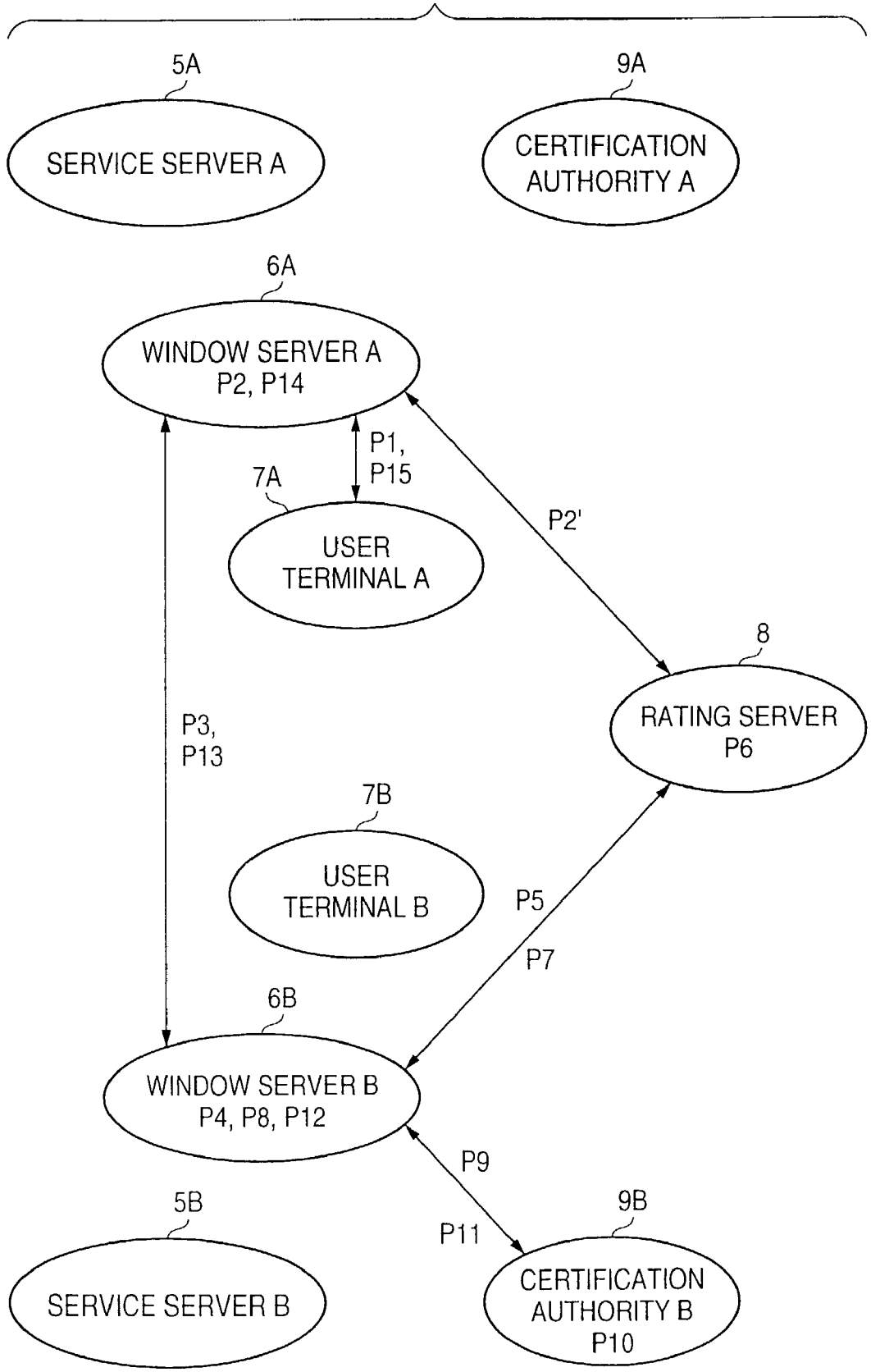
FIG. 5 is an explanatory diagram showing a mutual authentication operation of a mutual authentication system according to a second embodiment of the invention.

FIG. 5 is an explanatory diagram showing one operation concerning mutual authentication by the mutual authentication system of the second embodiment of the invention. With reference to FIGS. 4 and 5, explanation will be made on the operation concerning mutual authentication by the mutual authentication system of this embodiment.

First, in step P1, a user A (not shown) prepares a request command (message) utilizing the service (providing a resource, etc.) of the service server B (5B) by the use of the user terminal A (7A), and sends it to the window server A (6A). In step P2, the window server A (6A) authenticates the user A by an authentication scheme adopted by itself. This also analyzes a request command sent from the user terminal A and prepares a message requesting approval of a result of the authentication already made by the service server B (5B) to the window server A (6A) in order to undergo an authentication of the window server B (6B) required in utilizing the service of the service server B (5B). At this time, in case the authenticating entity (certification authority) required by the service server B (5B) is unknown, in step P2' a required authenticating entity is inquired to the rating server 8.

In step P3, the message prepared in step P2 is sent to the window server B (6B). It should be appreciated that, on this occasion, an authentication based on a public key certification for service is not made. This is because of a possible difference, in the certification authority issuing public key certifications or in the format oz authentication scheme of the public key certification, between the window server A (6A) and the window server B (6B). The protocol on this scene will be described later.

In step P4, the window server B (6B) analyzes the message sent from the window server A (6A) to determine whether to allow the use of a requested service or not. On this occasion, it is confirmed that the user the window server A (6A) has authenticated is the user A and the certification authority having issued the public key certification used in the authentication is the certification authority A (9A). The only additional information required is (1) certification authority A (9A), (2) assurance scope (assurance content) by the certification authority A (9A), (3) policy by the window server B (6B) and (4) how to shoulder an occurring expense.

Among these, the information (3) is the information requiring a determination on management or determination as a service system, which is the information to be determined by a human system. Meanwhile, the information (1), (2) and (4) can be resolved by the human system similarly to (3), but is made available by making reference to the credit information issued by the rating server 8 and the security sum correspondence table within a range of a common system or frame of the window server A (6A) and window server B (6B).

Where an expense occurrence is expected or monetary assurance exists for the service provided by the service server B (5B), the window server A (6A) prepares a message for the rating server 8 inquiring on a credit of the public key certification used in the authentication upon allowing the service and an assurance sum. It is assumed herein that an inquiry message is prepared to make reference to the credit information issued by the rating server 8 and the security sum correspondence table. The detail of the information to be inquired by the inquiry message will be described later.

In step P5, the window server B (6B) sends the inquiry message prepared in step P4 to the rating server 8. On this occasion, where the window server B (6B) and the rating server 8 possess the public key certifications issued by the same certification authority, the public key certifications acre used to mutually authentify and establish a secure path.

However, where the public key certifications are not issued by the same certification authority, an SSL-based secure path is established based on a server certification due to the rating server 8. Thereafter, a public key certification of the window server B (6B) is notified to the rating server 8, and the window server B (6B) makes a signature to the request. The rating server 8 first verifies the public key certification of the window server B (6B). Usually, if in the certification authority the rating server 8 relies upon, the public key certification of the window server B (6B) is held by or in an acquirable state in the rating server 8. The non-existence of the public key certification results in a high possibility of not being described in a credit correspondence table or security sum correspondence table of the rating server 8. The mutual authentication, concerning the certification issued by an certification authority the rating server 8 has not handled, is not concretely examined by the opposite and commonly dealt with as "other certification authority." The handling may be service refusal.

It is hereinafter assumed that, as a result of authentication on such a matter, the window server B (6B) has been determined as a handleable (reasonable) entity and mutual authentication has been done.

In step P6, the rating server 8 confirms an inquiry message sent from the window server B (6B). Where it is a reasonable inquiry message, an answer combined with a credit correspondence table and a security sum correspondence table is prepared. In step P7, the rating server 8 sends this answer to the window server B (6B) through the secure path established in step P5.

In step P8, the window server B (6B) verifies the received answer. Where the answer has a content that the service requested by the window server A (6A) is sufficient for being provided to the window server A (6A), the window server A (6A) is requested to generate a required pair of public keys through the secure path. Due to this, the window server A (6A) generates a required pair of public keys and sends them to the window server a (6B) through the secure path. If there is information necessitated by the window server B (6B), it is requested from the window server B (6B) to the window server A (6A). The window server B (6B) receives that information from the window server A (6A). Thereafter, the process proceeds to step P9.

Where the answer the window server B (6B) has received from the rating server 8 is determined insufficient in service for being provided to the window server A (6A), an answer message of service-providing refusal for the request by the window server A (6A) is prepared and attached by a signature of the window server B (6B). Thus the process proceeds to step P13.

In step P9, the window server B (6B) requests the certification authority B (9B) to issue a public key certification on the public key prepared in the step Q8. At this time, if necessary, a secure path is established between the window server B (6B) and the certification authority B (9B) to send the information of other than the public key from the window server B (6B) to the certification authority B (9B) through the secure path.

In step P10, the certification authority B (9B) issues a public key certification on the basis of the information sent from the window server B (6B). In step P11, the certification authority B (9B) sends the issued public key certification to the window server B (6B). In step P12, the window server B (6B) prepares an answer message containing the public key certification received from the certification authority B (9B) and attaches a signature onto it. In step P13, the window server B (6B) sends the answer message prepared in the step P8 or P12 to the window server A (6A).

Figure 6:
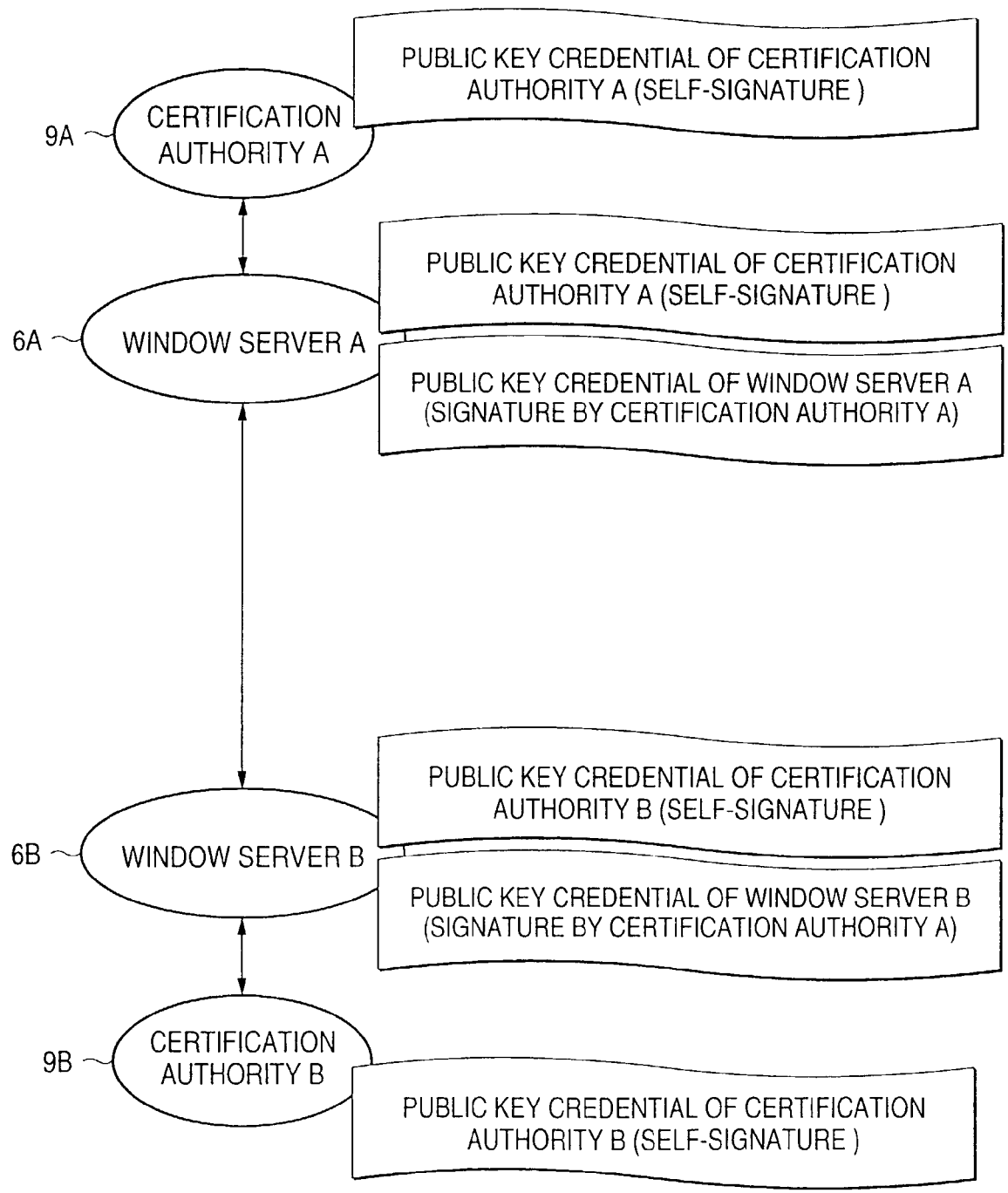
FIG. 6 is an explanatory diagram showing a method for sending a message by establishing a secure path between authenticating entities (service windows) having different certification authorities, in the mutual authentication system according to the second embodiment of the present invention.

In step P14, the window server A (6A) verifies the received answer message to confirm the absence of alteration. Where a public key is attached to the answer message, the public key is extracted to secure a required resource for service utilization. In step P14, through the user terminal A (7A) the user A is notified that preparation has been performed for utilizing the service of the service server B (5B) or that the service of the service server B (5B) is not available FIG. 6 is an explanatory diagram showing a method to send a message by establishing a secure path between the authenticating entities (service windows) having different certification authorities, in the mutual authentication system of the second embodiment of the invention. FIG. 6 shows a case the window server A (6A) acquires a permission for service utilization from the window server B (6B), such that the two authenticating entities (window server A (6A) and window server B (6B)) utilize a public-key-system cipher but are different in the certification authorities having granted the public key certifications held by the respective authorities.

In this case, usually, a serer certification of the window server B (6B) is used to carry out server authentication (note that the client end is given the window server A (6A)). A secure path (secret communication path) is established by commonly possessing a session key, to send a message from the window server A4 (6A) to the window server B (6B). The message is attached with an electronic signature of the window server A (6A) to specify a sender. The window server B (6B) receives the message and verifies the electronic signature. Also, if necessary, a self-certification of the certification authority A (9A) (self, i.e., certification to certify the certification authority A (9A)) is obtained.

Alternative methods, such as the following methods, may also be used.

Method 1: a public key certification of the window server A (6A) is utilized to establish a first secure path by a requester authentication (in this case, the window server A (6A) is a requester). Specifically, a secure path is established to the window server B (6B) by server authentication (the window server B (6B) is a server) and a shared session key, to request re-connection to the window server A (6A). On this occasion, the window server A (6A) issues a ticket in order to record a re-connection request from itself and the corresponding connection from the window server B (6B).

The ticket is managed by the window server A (6A). The window server B (6B) establishes a secure path to the window server A (6A) due to a server authentication and shared session key, to send back the ticket issued by the window server A (6A). The window server A (6A) checks the received ticket to confirm 40 a reasonable client, thereafter sending a message.

Method 2: using the public certifications granted by the respective different certification authorities, i.e., certification authority A (9A) and certification authority B (9B), for the window server A (6A) and the window server B (6B), a secure path is established by mutual authentication. In this case, the end having received, from the opposite, the public certification and signature obtains the public key certifications of the respective certification authorities having immediately granted. Thereafter, the signature of the opposite and the public key certification are verified, respectively. After mutual authentication, if there is no problem, consent is performed based on a session key to be used for a secure path. Thereafter, a secure path is established using the session key.

After specifying the opposite of communication, it is possible to make an inquiry to the rating server 8 shown in FIGS. 4 and 5 in order to confirm a reliability of the opposite. Naturally, depending on a result of the inquiry to the rating server 8, there may be a situation where it is not safe to establish a secure path if a problem exists.

Figure 7:
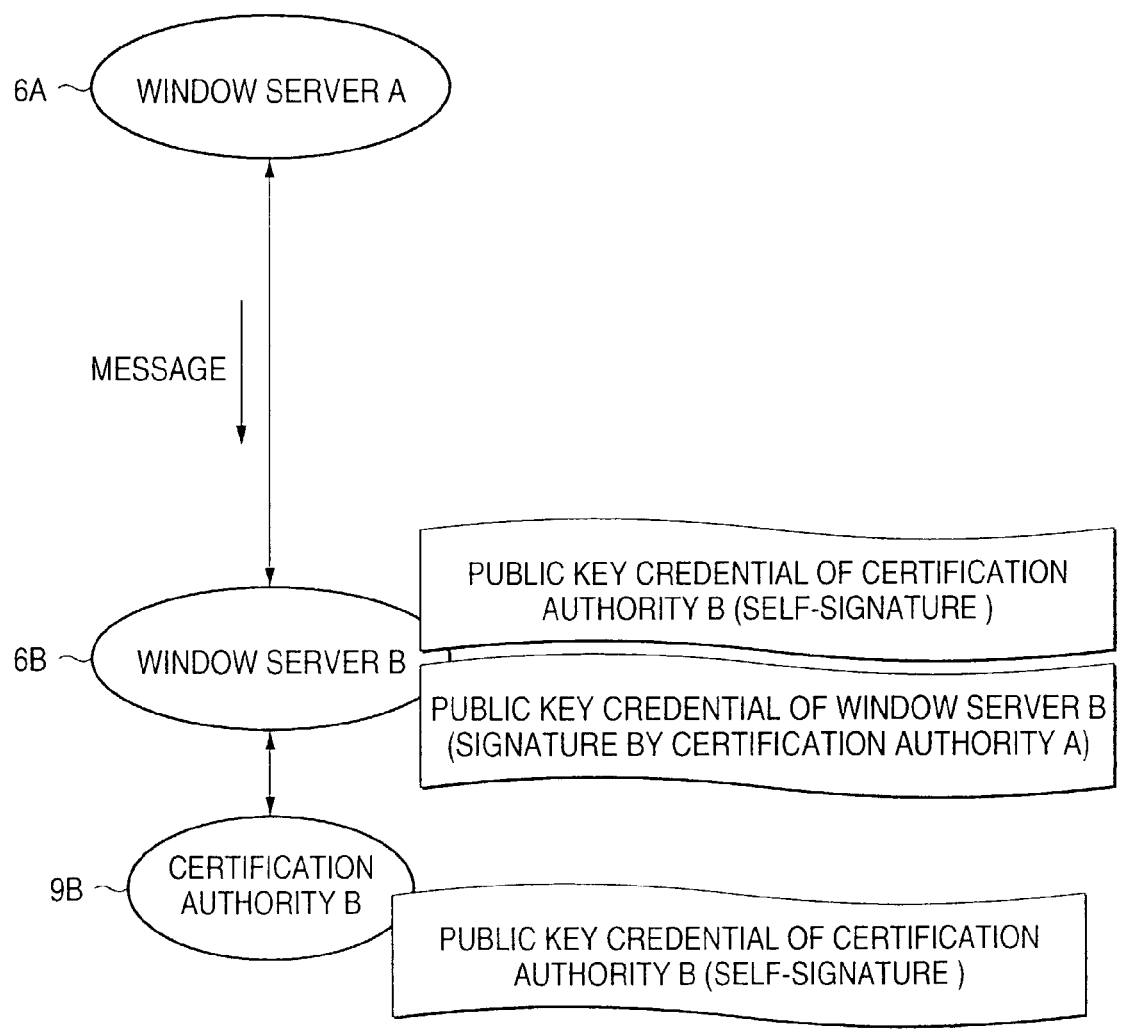
FIG. 7 is an explanatory diagram showing a method for sending a message between authenticating entities (service windows) adopting different encryption schemes, in the mutual authentication system according to the second embodiment of the present invention.

FIG. 7 is an explanatory diagram showing a method for sending a message between the authenticating entities (service windows) employing different encryption schemes, in the mutual authentication system of the second embodiment of the present invention. FIG. 7 shows a method for sending a message from the window server A (6A) to the window server B (6B) where the window server A (6A) employs an encryption scheme of other than a public-system encryption scheme while the window server B (6B) uses a public-system encryption scheme. Here, it is required to solve the below requirements.

Requirement 1: the message to be sent from the window server A (6A) to the window server B (6B) has been prepared by the window server A (6A). When there is an alteration, detection is possible for the alteration.

Requirement 2: the message to be sent from the window server A (6A) to the window server B (6B) is encrypted to prevent eavesdropping or interception.

Requirement 2 can be dealt with by server authentication (note the window server B (6B) is the server) and secure-path establishment due to a shared session key.

For Requirement 1, there exists a method that, where alteration can be detected by an encryption processing method adopted by the window server A (6A), an alteration can be verified after the processing in the window server B (6B). However, where an alteration cannot be detected by the encryption processing scheme employed by the window server A (6A), there is no countermeasure except for determining at the window server B (6B) whether to accept and process a message from such an entity. By previously registering the determination in the rating server 8 of FIG. 4, the window server A (6A) is allowed to make this check in advance, thereby making it possible to confirm whether the message to the window server B (6B) is sendable or not.

Where there are limiting items, restrictions, use conditions, etc. in the encryption system/authenticating system employed by the both of the window server A (6A) and the window server B (6B), the contents thereof can be previously registered in the rating server 8 of FIG. 4.

Where both the window server A (6A) and the window server B (6B) do not use a pubic-key-system cipher, the window server A (6A) sending a message can previously determine, by an inquiry to the rating server 8 of FIG. 4, whether the criterion adopted by itself satisfies a criterion required by the reception-side entity (herein, the window server B (6B)).

Figure 8:
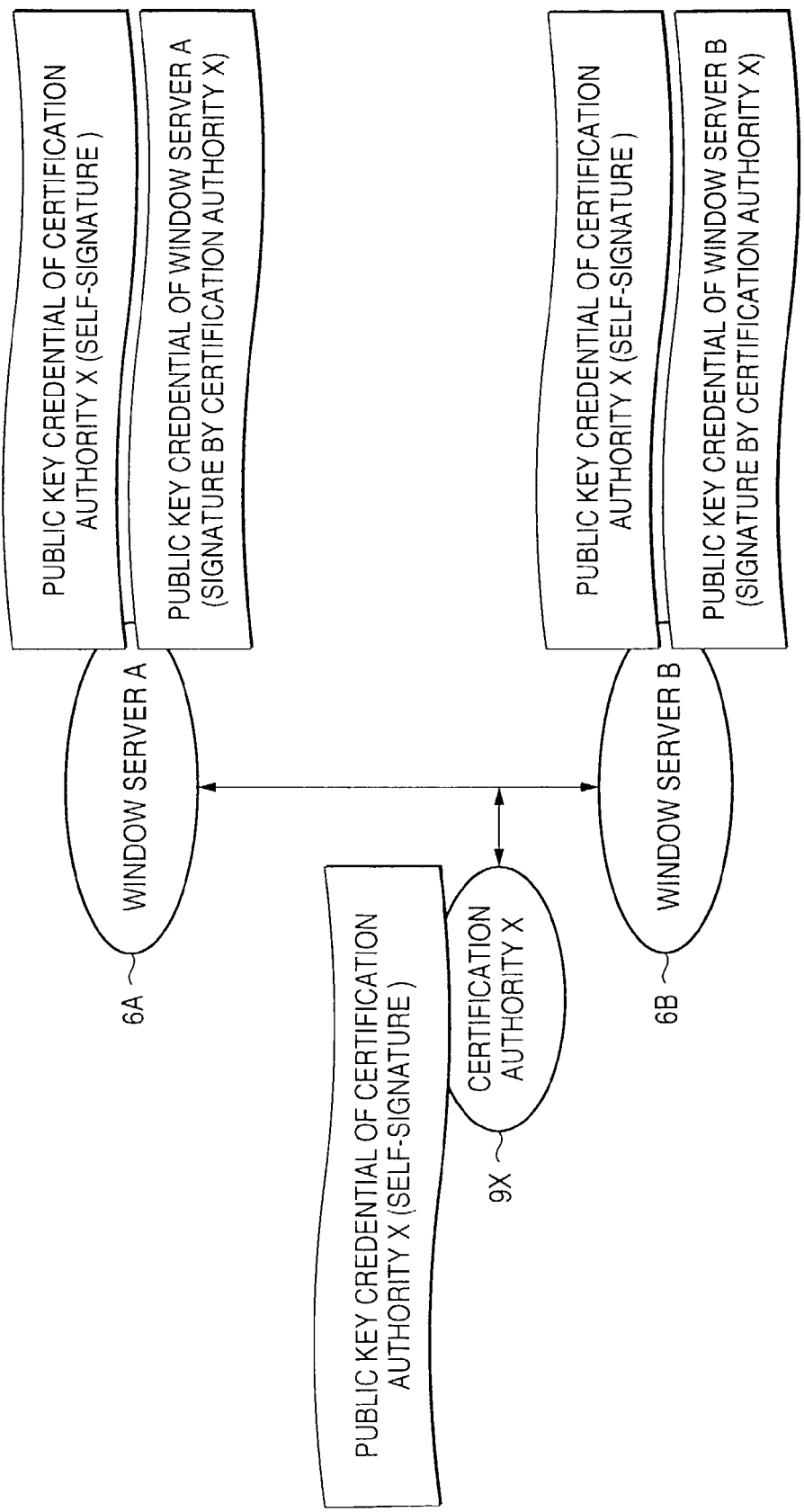
FIG. 8 is an explanatory diagram showing a method for sending a message between two authenticating entities (service windows) having common public key certifications, in the mutual authentication system according to the second embodiment of the present invention.

FIG. 8 is an explanatory diagram showing a method for sending a message between the two authenticating entities (service windows) holding the common public key certifications, in the mutual authentication system of the second embodiment of the present invention. FIG. 8 shows a method of sending a message from the window server A (6A) to the window server B (6B) where both of the window server A (6A) and the window server B (6B) hold anything like a certification (e.g., server certifications) due to the issuance service of the certification authority X (9X). Here, usual authentication processes and secure path establishment are performed.

There is no need to especially limit an certification authority (herein, certification authority X (9X)) from issuing certifications. For example, the rating server 8 of FIG. 4 may be an issuance service of an especially designated certification authority or an issuance service of a certification authority having no bearing therewith. However, the certifying (guaranteeing) content of the certification issued by the certification authority (herein, certification authority X (9X)) is required to be used in authenticating the opposite of communication and establishing a secure path.

Figure 9:
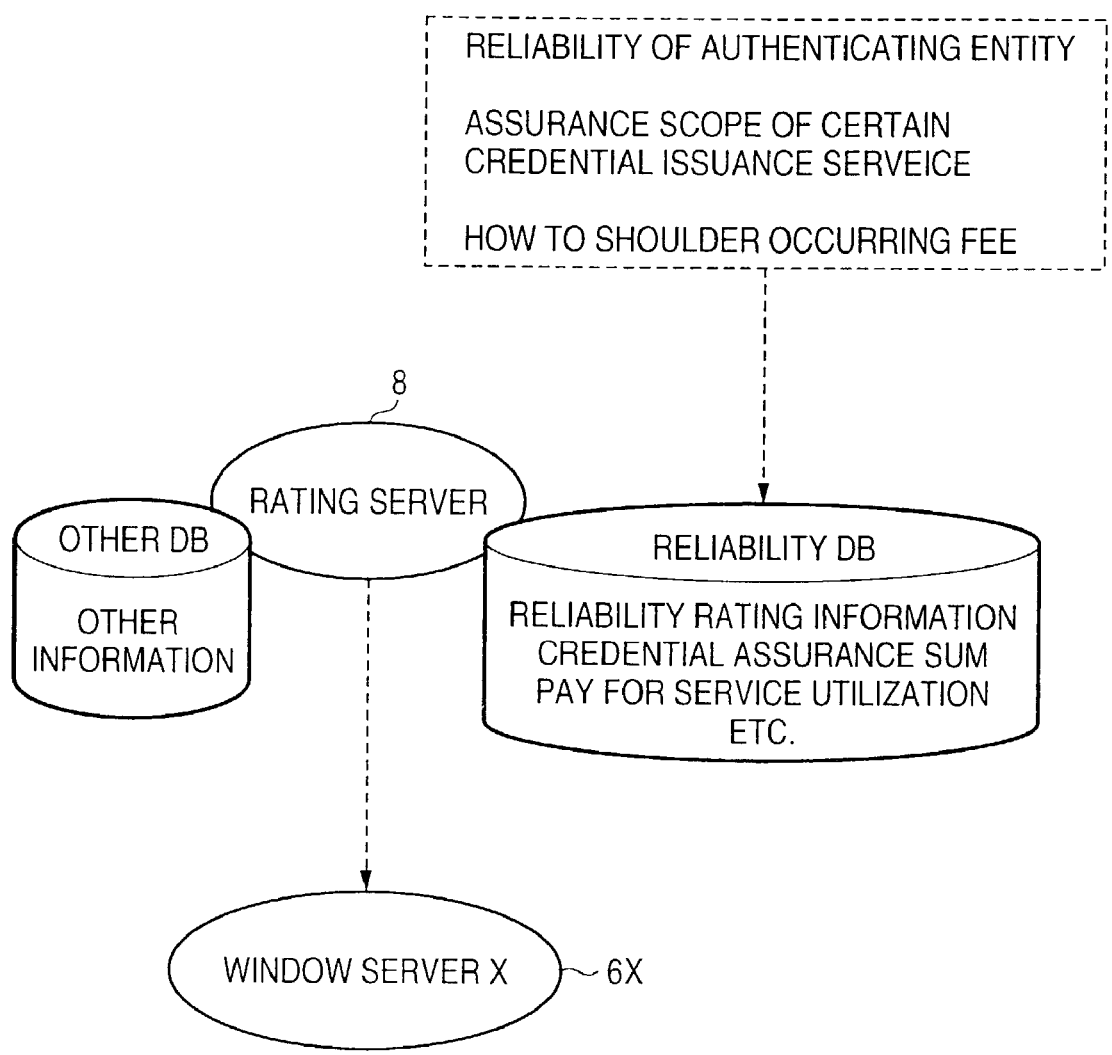
FIG. 9 shows evaluation items for various public key certifications issued by a certificate authority.

FIG. 9 is an explanatory diagram exemplifying the evaluation items held by the rating server in the mutual authentication system of the second embodiment of the present invention. FIG. 9 shows the evaluation items for a public key certification in various kind issued by the certification authority. The inquiry message from the window server also inquires on the evaluation items.

Although FIG. 9 exemplifies part of the evaluation items, generally the rating server (in this embodiment, rating server 8) records the evaluations on the following evaluation items:
(1) name of business firm providing service
(2) service name
(3) service kind
(4) window server name in utilizing a service
(5) certification issuing process, computer system, operation organization, check and supervisory organization
(6) subject of certification assurance
(7) range of certification assurance
(8) management status of the firm (certification authority or the like) issuing certifications (rating of firms based on the information opened to public, determined with reference to corporate debenture rating)
(9) certification-based service fee (service providable and pay thereof)
(10) fee payment in utilizing a certification-based service (interconnection surcharge, destination of transfer, settlement, etc.)
(11) possibility of interconnection with other services conditions e.g. allowed/not-allowed, allowed for part of services) and
(12) encryption scheme used in certification.

The evaluation items and evaluations thereof are stored in a credit database. It should be appreciated that the evaluation items (1)-(4) can be used as retrieval keys in retrieving the credit database.

Figure 10:
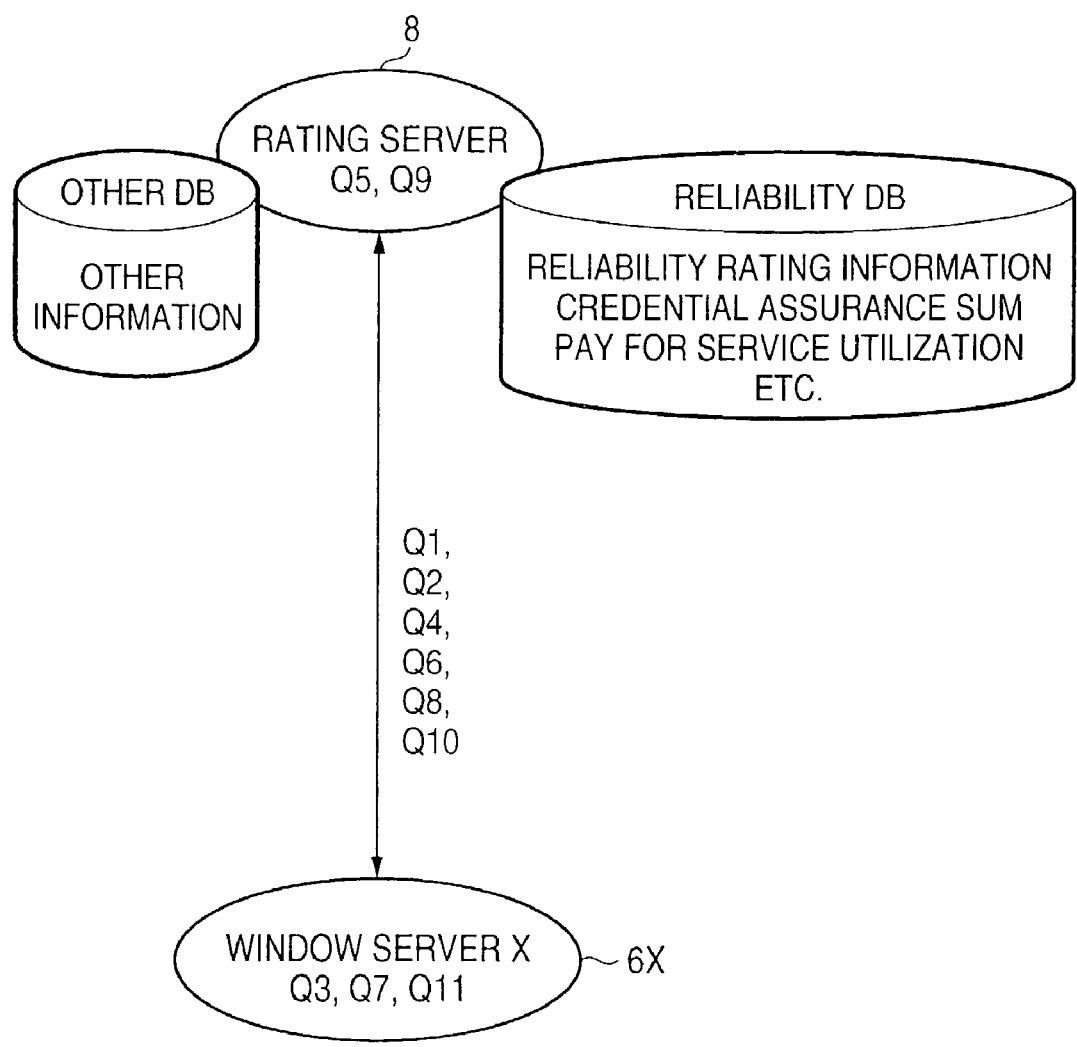
FIG. 10 is an explanatory diagram showing a communication protocol to be used between a rating server and a window server, in a mutual authentication system according to an embodiment of the present invention.

FIG. 10 is an explanatory diagram showing one example of a communication protocol used between the rating server and the window server, in the mutual authentication system of this embodiment. The communication protocol of FIG. 10 assumes that a certain one window server X (6X) is issued with a public key certification certifying that the window server X (6X) is a server having an inquiry right to the rating server 8.

First, in step Q1, the window server X (6X) sends to the rating server 8 a public key certification of the window server X (6X) and a secure-path establishing request (request message) with an electronic signature of the window server X (6X). In step Q2, the rating server 8 verifies a public key certification sent from the window server X (6X) and an electronic signature of the secure-path establishing request to confirm an authorized requester. After this confirmation, a signature of the rating server 8 is attached to the request message sent from the window server X (6X) and sent, together with the public key certification of the rating server 8, to the window server X (6X).

In step Q3, the window server X (6X) confirms the public key certification of the rating server 8 and the request message attached with a signature of the rating server 8. In step Q4, the window server X (6X), after confirming the computer at the opposite is a correctly rated server 8, determines a sub-session key and prepares a sub-session key transmission message. Next, a message encrypted, by a public key of the rating server 8, with a prepared sub-session key transmission message attached with an electronic signature of the window server X (6X) and a public key certification of the window server X (6X) are sent to the rating server 8.

In step Q5, the rating server 8 decrypts the received message by a private key to verify the electronic signature of the sub-session key transmission message, thereby confirming the window server X (6X). Thereafter, the rating server 8 prepares a session key and attaches the signature with a private key of the rating server 8, and further encrypts it with a sub-session key.

In step Q6, the rating server 8 sends the session key and signature encrypted in step Q5 to the window server X (6X). In step Q7, the window server X (6X) decrypts the received session key and signature bar a sub-session key, to extract the session key and the signature of the rating server 8. Next, the signature is confirmed, and thereafter the message is encrypted by the session key. In step Q8, the window server X (6X) attaches a signature of the window server X (6X) to a request message selected from an inquiry menu prepared for the rating server 8, and sends the message encrypted by the session key to the rating server 8.

In step Q9, the rating server 8 decrypts the received message to verify the signature of the window server X (6X). Retrieval is made for response data to the request message. Then, the response data is attached by a signature of the rating server 8, and encrypted by the session key. In step Q10, the rating server 8 sends the response data with signature encrypted in step Q9 to the window server X (6X). In step Q11, the window server X (6X) decrypts the received response data with signature by a session key, to confirm the signature. It should be appreciated that the steps Q1-Q7 can be replaced with the other procedures or methods for establishing a secure path.

Third Embodiment

This embodiment is concerned with a mutual authentication system according to a model where the rating server temporarily grants credit to the window server. The mutual authentication system of the third embodiment of the present invention has a similar configuration to the configuration of the mutual authentication system of the second embodiment of the present invention. However, the procedure for realizing mutual authentication and the processes by the constituent elements are different from those of the mutual authentication system of the second embodiment of the present invention.

Figure 11:
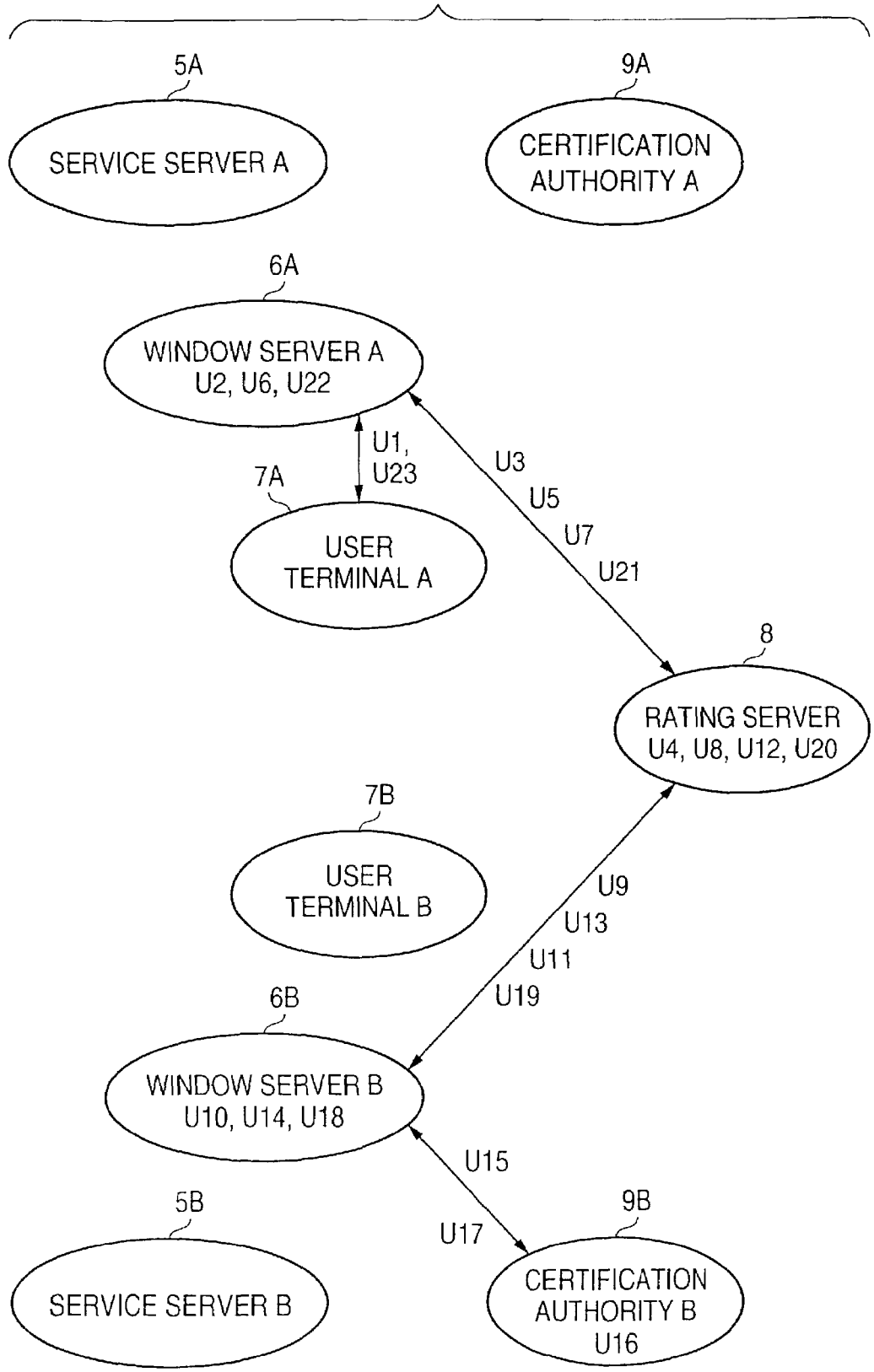
FIG. 11 is an explanatory diagram showing a realizing method (process procedure) of mutual authentication, in a mutual authentication system according to a third embodiment of the present invention.

FIG. 11 is an explanatory view showing a realizing method (process procedure) of mutual authentication in the mutual authentication system of the third embodiment of the present invention.

First, in step U1, a user A (not shown) uses the user terminal A (7A) to send a service request command requesting a service provided by the service server B (5B) (providing a resource, etc.) to the window server A (6A). It should be noted that the authentication between the user A and the window server A (6A) as well as secure path establishment has assumably been completed already.

In step U2, the window server A (6A) prepares a request message requesting the credit grant required in enjoying a service provided by the service server B (5B) on the basis of the received service request command, and attaches it with an electronic signature of the window server A (6A).

In step U3, the window server A (6A) makes a mutual authentication with the rating server 8 on the basis of a public key certification (note the rating server 8 has already issued a public key certification made by the window server A (6A) and requested for issuance, the rating server 8 itself being allowed to use it). At this time, a session key, if necessary, is consented to establish a secure path. Thereafter, the request message prepared in step U2 is sent to the rating server 8.

In step U4, the rating server 8 verifies the request 49 message sent in the step U3 to check a service requested. At this time, the credit required in providing a requested service and an assurance sum of the public key certification are examined. Simultaneously, the credit of the window server A (6A) and the assurance sum of the public key certification are checked. Due to this, where there is insufficiency in the credit of the window server A (6A) and the assurance sum of the public key certification, a surcharge is imposed in providing the service or service providing is refused. When providing the service with a surcharge, it is confirmed that the window server A (6A) is not in refusal. When it is confirmed that the service is providable, a notification that the service is providable and a service utilization registering request to be sent to the window server B (6B) that the service server B (5B) has authenticated are prepared. The notification that the service is providable includes the conditions of required signature key, a cipher key length and an encryption scheme. Where the service is not providable, a notification that the service is impossible to provide is prepared.

In step U5, the response prepared in step U4 (notification or request concerning service providing) is attached by a signature of the rating server 8 and sent to the window server A (6A). In step U6, the window server A (6A) confirms the signature of the received response to confirm that it is a response from the rating server 8. When the notification of service providing is a notification the service is providable, the notification is extracted of the required signature key, cipher-key length and encryption scheme. Also, a key of a designated scheme is prepared. Namely, a pair of public and secret keys are prepared to record the secret key by linking it to the service request command from the user A received in the step U1.

In step U7, the window server A (6A) transmits the public key prepared in step U6 to the rating server 8. In step U8, the rating server 8 confirms that the public key received from the window server A (6A) is a key of a designated scheme. If it is a key of a designated scheme, a service utilization registering request to be sent to the window server B (6B) is prepared.

A number of methods are selectable in the process procedure from service-utilization registering preparation to certification-issuance preparation of the below steps U8-U10.

Method 1: all the required pieces of information are embedded in a service-utilization registering request to be sent in step U9.

Method 2: a required protocol is previously determined between the rating server 8 and the window server B (6B) wherein the rating server 8 side deals therewith.

Method 3: a required protocol is previously determined between the rating server 8 and the window server B (6B) wherein the window server B side deals therewith.

Where the public key received from the window server A (6A) is an illegitimate key (riot the key of a designated scheme), an abnormality response notifying an illegitimate key is prepared. Then, the process proceeds to step U21.

In step U9, in order for the rating server 8 to send the service-utilization registering request prepared in step U4 to the window server B (6B), mutual authentication is made based on a public key certification between the rating server 8 and the window server B (6B). At this time, a session key, if necessary, is consented to establish a secure path. Thereafter, the service-utilization registering request is sent to the window server B (6B).

In step U10, the window server B (6B) verifies the received service-utilization registering request to determine whether to register or reuse. In the case of refusal, a non-permission response is prepared and the process proceeds to step U19. Wherein permission is granted, the data required in authentication is obtained by any of the three methods described in step U8. However, Method 1 is assumably selected herein and the process proceeds to step U13.

In step U11, the window server B (6B) requests the information required in authentication to the rating server 8, as a step where Method 2 or 3 are selected. In step U12, the rating server 8 prepares the information required for the authentication for transmission to the window server B (6B) as a step where Method 2 or 3 are selected.

In step U13, the rating server 8 sends the data required in authentication to the window server B (6B). When selecting Method 2 or 3, the steps U11-U13 are repeated a required number of times. After obtaining sufficient information, the process proceeds to step U14.

In step U14, the window server B (6B) verifies the received data required in authentication. Where there is a problem, non-permission is determined to prepare an abnormal response, and the step proceeds to step U19. If there is no problem, an issuance request (issued to the certification authority B (9B)) of a public key certification according to a format previously determined between the certification authority B (9B) and the window server B (6B) is prepared. Naturally, there are a variety of protocols that can be used between the window server B (6B) and the certification authority B (9B). Herein, the method assumably includes the information required for a pubic-key-certification issuance request. Also, there are cases where a number of exchanges are made in steps U14-U16.

In step U15, mutual authentication is made based on a public key certification between the certification authority B (9B) and the window server B (6B). After confirming the opposite of communication, a session key if necessary is consented to establish a secure path. Thereafter, the issuance request for a public key certification prepared in step U14 is sent to the certification authority B (9B).

In step U16, the certification authority B (9B) prepares and issues a public key certification for the public key in a requested format. In step U17, the certification authority B (9B) sends the public key certification to the window server B (6B). In step U18, the window server B (6B) attaches a signature of the window server B (6B) to the received public key certification. In step U19, the window server B (6B) sends the public key certification or a non-permission or abnormal response to the rating server 8.

In step U20, the rating server 8, when receiving the public key certification, verifies the signature of the window server B (6B) attached to the public key certification. Thereafter, with a permission response, a signature of the rating server 8 is added to the received public key certification having the signature of the window server B (6B).

In step U21, the rating server 8 sends the public key certification having a signature or the abnormal response to the window server A (6A). In step U22, the window server A (6A) verifies the received public key certification having a signature to confirm the signature of the rating server 8. Thereafter, the public key certification is linked to the pair of public and secret keys linked to the service request command of from the user A in step U6.

In step U23, the window server A (6A) notifies the user A that service utilization has been prepared, through the transmission to the user terminal A. It should be appreciated that the methods of authentication between the entities, data signature and encryption shown in FIGS. 6-8 are also applicable to this embodiment. In addition, the evaluation items by the certification authority shown in FIG. 9 are applicable as the evaluation items by the certification authority of this embodiment.

Fourth Embodiment

This embodiment relates a mutual authentication system according to a model that the rating server temporarily grant a credit to the window server by the use of a public key certification and public key pair. The mutual authentication system of the fourth embodiment of the present invention has a similar configuration as the mutual authentication system of the second embodiment of the present invention. However, the procedure for realizing mutual authentication and the processes by the constituent elements axe different from those of the mutual authentication system of the second embodiment.

Figure 12:
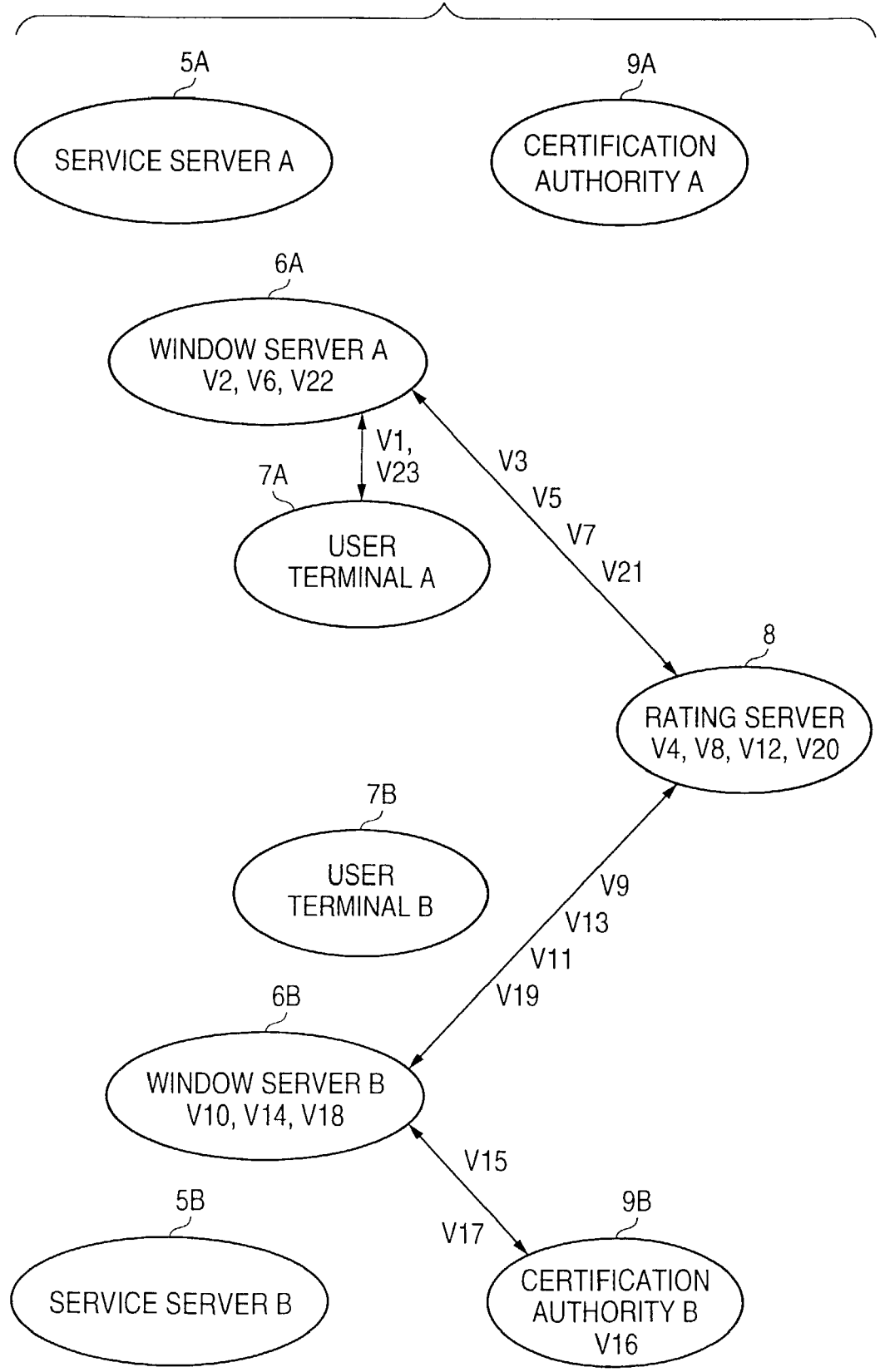
FIG. 12 is an explanatory diagram showing a realizing method (process procedure) of mutual authentication, in a mutual authentication system according to a fourth embodiment of the present invention.

FIG. 12 is an explanatory diagram showing a realizing method (process procedure) for mutual authentication in the mutual authentication system of the fourth embodiment of the present invention.

First, in step V1, mutual authentication is made between the user terminal A (7A) of a user A (not shown) and the window server A (6A). If necessary, after establishing a secure path, the window server A (6A) is requested to utilize the service to be provided by the service server B (5B) (providing a resource or the like, hereinafter referred to as "service B").

In Step V2, the window server A (6A) analyzes the request of from the user A through the user terminal A (7A) and prepares a message, to the rating server 8, requesting to acquire the authentication required in utilizing the service B provided that the window server A (6A) allows for service B utilization. An electronic signature of the window server A (6A) is attached to this message.

In step V3, mutual authentication is made based on the public key certification between the rating server 8 and the window server A (6A). If necessary, consent is made on a session key to establish a secure path. Thereafter, the message prepared step V2 is sent from the window server A (6A) to the rating server 8.

In step V4, the rating server 8 verifies the electronic signature of the received message. Also, the content of this message is analyzed to check a requested service. A credit required in providing the service and a security sum of the public key certification are examined Also, a check is made on a credit of the window server A (6A) and public-key-certification security sum.

Where there is insufficiency in the credit of the window server A (6A) or in the security sum of the public key certification, a surcharge is imposed on the requested service being provided or providing the service is refused. When imposing a surcharge, confirmation is made that there is no refusal by the window server A (6A). Where the service is possible to provide, a possibility response and a service-utilization registering request to be sent to the window server B (6B) as a window for the service B are prepared. The possibility response includes a service identifier assigned at the rating server 8 end. Incidentally, when the service is impossible to provide, an impossibility response is prepared. Thereafter, an electronic signature of the rating server 8 is attached to the prepared response.

In step V5, the response prepared in the step V4 is sent to the window server A (6A). In step V6, the window server A (6A) verifies the electronic signature of the received response to confirm that it is a response from the rating server 8. In the case of a possible response, a providing-service identifier is extracted from the possibility response (hereinafter, this providing-service identifier is used in an inquiry for utilizing the service B from the user A to the rating server 8). Thereafter, a response message describing the providing-service identifier is prepared. An electronic signature of the window server A (6A) is attached to this response message.

In step V7, the window server A (6A) sends the response message having the electronic signature describing the providing-service identifier to the rating server 8. In step V8, the rating server 8, after verifying the electronic signature of the received response message, prepares a service-utilization registering request to be transmitted to the window server B (6B) in order to undergo authentication by the window server B (6B) in place of the user A as a user of the window server A (6A). Also, a pair of public and secret keys required in utilizing the service B are prepared. A key length, an encryption scheme and the like are examined and prepared.

A number of methods/protocols are selectable in the process procedure from service-utilization registering preparation to certification issuance preparation in the below steps V8-V10.

Method 1: all the required pieces of information are embedded in a service-utilization registering request to be sent in step V9.

Method 2: a required protocol is previously determined between the rating server 8 and the window server B (6B), wherein the rating server 8 side deals therewith.

Method 3: a required protocol is previously determined between the rating server 8 and the window server B (6B), wherein the window server B (6B) side deals therewith.

Where the electronic signature of a received response message is illegitimate or the service identifier is abnormal, an abnormal response is prepared to notify an abnormality to the window server A (6A), and the process proceeds to V21. Next, an electronic signature of the rating server 8 is attached to a service-utilization registering request to be sent.

In step V9, in order for the rating server 8 to send the service-utilization registering request prepared in step V4 to the window server B (6B), mutual authentication is made based on a public key certification between the rating server 8 and the window server B (6B). On this occasion, if necessary, consent is made based on a session key to establish a secure path. Thereafter, the service-utilization registering request is sent to the window server B (6B).

In step V10, the window server B (6B) verifies the received service-utilization registering request to determine whether to register or refuse. In the case of refusal, a non-permission request is prepared and the process proceeds to step V19. Where permission is granted, the data required in authentication is obtained by any of the three methods described in step V8. Here, it is assumed that the Method 1 is selected, and the process proceeds to step V13.

In step V11, as a step when selecting the Method 2 or 3, the window server B (6B) requests the information required in authentication to the rating server 8. In step V12, as a step when selecting Method 2 or 3, the rating server 8 prepares the information required in authentication to be sent to the window server B (6B). In step V13, the rating server 8 sends the data required in authentication to the window server B (6B). When selecting method 2 or 3, the steps V11-V13 are repeated a required number of times. After obtaining sufficient information, the process proceeds to step V14.

In step V14, the window server B (6B) verifies the received data required in authentication. If there is a problem, non-permission is determined to prepare an abnormal response, and the step proceeds to V19. If there is no problem, an issuance request (to be requested to the certification authority B (9B)) of a public key certification according to a format previously determined between the certification authority B (9B) and the window server B (6B) is prepared. It should be appreciated that there are a variety of protocols between the window server B (6B) and the certification authority B (9B). Herein, the method assumably includes the information required in public key certification issuance request. Also, a number of exchanges may be made in the steps V14-V16.

In step V15, mutual authentication is made based on the public key certification between the certification authority B (9B) and the window server B (6B). After confirming the opposite of communication, consent, if necessary, is made based on a session key to establish a secure path. Thereafter, the issuance request for a public key certification prepared in step V14 is sent to the certification authority B (9B).

In step V16, the certification authority B (9B) prepares and issues a public key certification for the public key according to a requested format. In step V17, the certification authority B (9B) sends the public key certification to the window server B (6B). In step V18, the window server B (6B) attaches a signature of the window server B (6B) to the received public key certification. In step V19, the window server B (6B) transmits the public key certification or a non-permission response or abnormal response to the rating server 8.

In step V20, the rating server 8, when receiving the public key certification, verifies the signature of the window server B (6B) attached to the public key certification. Thereafter, the received public key certification having a signature of the window server B (6B) is linked to the pair of public and secret keys linked to the providing-service identifier. Thereafter, a registration success notification is prepared, and an electronic signature of the rating server 8 is attached thereto.

In step V21, the rating server 8 sends the registration success notification having an electronic signature to the window server A (6A). In step V22, the window server A (6A) verifies the received registration success notification having an electronic signature to confirm the signature of the rating server 8. Thereafter, a notification message to the user A to make effective a service request using a providing-service identifier is prepared. In step V23, the window server A (6A) sends a notification message to the user terminal A of the user A.

It should be appreciated that the methods of authentication between the entities, data signature and encryption shown in FIGS. 6-8 are also applicable to this embodiment. Also, the evaluation items by the certification authority shown in FIG. 9 are applicable as evaluation items by the certification authority of this embodiment.

As described above, in the present invention, the over-network resource distribution system is provided with a window server on duty of window operation of a resource providing server, wherein the window server has a first user information database recording the user information required in authenticating a user and a first resource provider information database recording the credit of a resource provider (entity) within a network community. Furthermore, the resource providing server has a second resource provider information database recording the information required in authenticating the window server and a second user information database recording the user information including the information concerning the user authenticated by the window server. Thus, the resources kept by a number of entities can be utilized by each of the entities.

Also, the network community having a number of communities is set up with a rating server having a function to evaluate the public key certifications respectively issued by a number of certification authorities belonging to any of the number of communities, to enable checking for mutual credits, credits of the public key certifications used and security sum between a number of window servers belonging to any of the number of communities. Due to this, mutual authentication as needed in mutually utilizing the services provided by the number of entities is effectively realized.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An over-network resource distribution system for allowing one or more users to request resources to be provided by at least one resource providing server through user terminals connected by a communication line to the resource providing server, the resource requested being downloaded for utilization through the communication line onto the user terminal, the system comprising:
   at least one window server having a first user information database recording information required in authenticating the user and a first resource provider information database recording information required in verifying a correctness reliability of a resource provider and transmitting a reliance level related to the resource provider, the level being at least one of reliable, less reliable or not reliable, to serve as a window of a resource request to be sent from an arbitrary one of the user terminals of the users to the resource providing server thereby sending a resource request command corresponding to the resource request to the resource providing server designated in the resource request; and
   the resource providing server having a second resource provider information database recording information required in authenticating the window server and recording information required in verifying a reliability of the window server and recording information required in determining an optimal resource provider, providing information associated with an optimal resource provider, and verifying a reliability of a resource provider, a second user information database extractably recording information about the user authenticated by the window server and recording reliability information associated with the user, and a permission data database recording restrictions for accessing a resource to be provided to the user and sending the resource in response to a resource request from arbitrary one of the window servers after determining the restrictions related to a requested resource, wherein the restrictions are based on a type of the resource provider and the state of the resource which includes at least copyright status.

2. A window server for providing a service from a resource providing server in which a resource is to be provided according to a request onto a user terminal in which the resource is to be downloaded, the window server comprising:

a storage unit for storing information including personal information of a user using the user terminal and resource provider information for providing the resource;

an authenticator for authenticating the user terminal by making reference to the storage unit, according to a resource request from the user terminal to the resource providing server, and for authenticating the resource to the user terminal;

a verifier for verifying a correctness reliability of the resource providing server in the request and transmitting a reliance level related to the resource provider, the level being at least one of reliable, less reliable or not reliable; the verifier additionally in resource information sent from the resource providing server;

a communication unit for sending a request command of the resource to the resource providing server when a correctness reliability of the resource providing server is confirmed in the verifier, and for receiving the resource from the resource providing server;

an updating unit for updating the personal information of the storage unit when, in the communication unit, the resource requested from the user terminal is sent from the user terminal; and a converter for converting the resource into a utilizable resource.

3. A resource providing server for receiving a resource request from a user terminal through a window server, the resource providing server comprising:

a communication unit for receiving the resource request from the user terminal and providing the resource;

a storage unit storing at least one of personal information of a user using the user terminal and correctness reliability information of the window server;

a verifier for verifying the resource request received from the window server by making reference to the storage unit by verifying at least one of the window server and the user, wherein the communication unit provides the resource when an authenticator authenticates the resource request, and for providing information associated with an optimal resource provider, and verifying a reliability of a resource provider;

a resource provider database for recording information associated with a resource, a resource provider and an optimal resource provider and recording information required in verifying a reliability of the window server;

a user information database extractably recording information about the user authenticated by the window server and recording reliability information associated with the user; and a permission data database recording restrictions for accessing a resource to be provided to the user, wherein the restrictions are determined prior to providing a requested resource and the restrictions are based on a type of the resource provider and the state of the resource which includes at least copyright status.

4. A resource providing server according to claim 3, wherein the authenticator makes an authentication based on the previously set information of whether to authenticate a reliability of at lease one of the user terminal and the window server.

5. A resource providing server according to claim 3, wherein, when a utilization-requested resource is not held in the resource providing server, the communication unit sends a utilization request to another resource providing server holding the resource, and, when the resource providing server is authenticated in the other resource providing server, the resource is received from the other server.

6. A resource providing server according to claim 5, wherein the storage unit stores previously set reliability information about a reliability of the other resource providing server.

7. A mutual authentication system in a network community including a first community having one or more service servers, one or more users who use services provided by the service servers and one or more window servers mediating between the service servers and the user terminals of the users, and a second community having similar constituent elements as the first community, the mutual authentication system comprising:

a first certification authority for issuing a public key certification prepared by an arbitrary one of the window servers belonging to the first community;

a second certification authority for issuing a public key certification prepared by an arbitrary one of the window servers belonging to the second community; and a rating server having a correctness reliability database recording evaluation information such that public key certifications issued by the first and second certification authorities are evaluated based on predetermined evaluation items to determine the reliability of the first and second certification authorities which includes at least consideration of credit information and a security sum, wherein the security sum is based on credit-rating information.

8. An authentication system to allow for a service according to a utilization request from a user terminal, the authentication system comprising:

a first receiver for receiving a utilization request of a service from the user terminal;

an authenticator for authenticating the user terminal;

a preparation unit for preparing authentication result information when the user terminal is authenticated in the authenticator, in a service server as a destination of the utilizing request of the service transmitted from the user terminal;

a first authenticating server having a transmitter to send the authentication result information prepared in the preparation unit to the utilization request destination service server;

a second receiver for receiving the authentication result information;

a confirmation unit for confirming the user terminal and the first authenticating server by making reference to the authentication result information; and a second authenticating server having a second transmitter to send utilization permission information of the service to the user terminal when confirmation is made in the confirmation unit;

wherein the confirmation unit in the second authenticating server makes reference to authentication information on the first authenticating server in a rating server registered with authentication information of a plurality of authenticating servers, in order to authenticate the first authenticating server, wherein the rating server includes correctness reliability information based on predetermined evaluation items to determine the reliability of a certification authority of the service server which includes at least the consideration of credit information and a security sum, wherein the security sum is based on credit-rating information.

9. A method of providing a service from a resource providing server in which a resource is to be provided according to a request onto a user terminal in which the resource is to be downloaded, the method comprising the steps of:

storing, in a storing area, information including personal information of a user using the user terminal and resource provider information for providing the resource;

authenticating the user terminal by making reference to the information stored in the storing area according to a request of a resource from the user terminal to the resource providing server, and authenticating the resource to the user terminal;

verifying a correctness reliability of the resource providing server in the request and transmitting a reliance level related to the resource provider, the level being at least one of reliable, less reliable or not reliable, and verifying resource information sent from the resource providing server;

sending a request command of the resource to the resource providing server when a correctness reliability of the resource providing server is confirmed in the verifying step;

receiving the resource from the resource providing server;

updating the information stored in the storing area when sending the resource requested from the user terminal in the receiving step; and converting the resource into a utilizable resource.

10. A method of authentication for allowing for a service according to a utilization request from a user terminal, the method comprising the steps of:

receiving a utilization request of a service from the user terminal;

authenticating the user terminal;

preparing authentication result information when the user terminal is authenticated in the authenticating step, in a utilization-request-destination service server of the service sent from the user terminal;

sending the authentication result information prepared in the preparing step to the utilization-request-destination service server;

verifying a correctness reliability of the utilization-request-destination service server from which a resource is to be provided and receiving a reliance level related to the resource provider, the level being at least one of reliable, less reliable or not reliable, and verifying resource information sent from the resource providing server;

receiving the authentication result information;

confirming the user terminal and the first authenticating server by making reference to the authentication result information;

preparing an authentication of the service to the user terminal;

converting the service to a utilizable format; and sending utilization permission information the service to the user terminal when confirmation is made in the confirming step.

11. A mutual authentication system according to claim 7, wherein the predetermined evaluation items comprise a name of a business firm providing a service, a service name, a service kind, a window server name, a subject of certification assurance, a range of certification assurance, a management status of an issuing firm, a certification-based service fee, a fee payment in utilizing a certification-based service, a possibility of interconnection with other services conditions, and an encryption scheme used in certification.

12. A mutual authentication system according to claim 7, wherein the predetermined evaluation items are selected from a group consisting of a name of a business firm providing a service, a service name, a service kind, a window server name, a subject of certification assurance, a range of certification assurance, a management status of an issuing firm, a certification-based service fee, a fee payment in utilizing a certification-based service, a possibility of interconnection with other services conditions, and an encryption scheme used in certification and configurations thereof.

13. An authentication system according to claim 8, wherein the predetermined evaluation items comprise a name of a business firm providing a service, a service name, a service kind, a window server name, a subject of certification assurance, a range of certification assurance, a management status of an issuing firm, a certification-based service fee, a fee payment in utilizing a certification-based service, a possibility of interconnection with other services conditions, and an encryption scheme used in certification.

14. An authentication system according to claim 8, wherein the predetermined evaluation items are selected from the group consisting of a name of a business firm providing a service, a service name, a service kind, a window server name, a subject of certification assurance, a range of certification assurance, a management status of an issuing firm, a certification-based service fee, a fee payment in utilizing a certification-based service, a possibility of interconnection with other services conditions, and an encryption scheme used in certification and configurations thereof.

\* \* \* \* \*